United States Patent
Kudirka et al.

(10) Patent No.: US 10,409,363 B1
(45) Date of Patent: Sep. 10, 2019

(54) MIXED-REALITY GOLF TRACKING AND SIMULATION

(71) Applicant: vGolf LLC, Omaha, NE (US)

(72) Inventors: Thomas Kudirka, Omaha, NE (US); Patrick Bennett, Omaha, NE (US)

(73) Assignee: vGolf, LLC, Omaha, NE (US)

( * ) Notice: Subject to any disclaimer, the term of this patent is extended or adjusted under 35 U.S.C. 154(b) by 0 days.

(21) Appl. No.: 16/013,822

(22) Filed: Jun. 20, 2018

Related U.S. Application Data

(63) Continuation-in-part of application No. 16/002,860, filed on Jun. 7, 2018, which is a continuation-in-part
(Continued)

(51) Int. Cl.
*G06F 3/01* (2006.01)
*G06T 13/40* (2011.01)
(Continued)

(52) U.S. Cl.
CPC .......... *G06F 3/011* (2013.01); *A63B 69/3658* (2013.01); *A63B 69/3691* (2013.01);
(Continued)

(58) Field of Classification Search
CPC ........ A63B 53/0466; A63B 2053/0433; A63B 37/0075; A63B 37/0074; A63B 53/04; A63B 2053/0416; A63B 2220/44; A63B 2220/803; H04N 7/181; H04N 21/21805; G06Q 10/0833; G06F 17/5009
See application file for complete search history.

(56) References Cited

U.S. PATENT DOCUMENTS 9,694,269 B2    7/2017  Leech et al.
9,802,102 B2   10/2017  Leech
(Continued)

FOREIGN PATENT DOCUMENTS

EP       3200008 A1    8/2017

OTHER PUBLICATIONS

International Search Report and Written Opinion dated Aug. 29, 2018 for PCT/US2018/034949.
(Continued)

*Primary Examiner* — Xilin Guo
(74) *Attorney, Agent, or Firm* — Suiter Swantz pc llo

(57) ABSTRACT

A mixed-reality golf simulation system includes a ball-tracking sub-system to generate ball-tracking data when a golf ball is hit by a user, a near-eye display, a storage device to store panoramic images of a hole of a golf course associated with location coordinates of a plurality of locations along the hole, and a controller. The controller may direct the near-eye display to display a mixed-reality environment including a virtual reality scene from the perspective of a first location on the hole over based on images associated with location coordinates of the first location, receive ball-tracking data of a ball hit by the user in real-time, and direct the near-eye display to display the mixed-reality environment including a virtual reality scene from the perspective of a landing location of the ball based on images device associated with location coordinates of the landing location of the ball.

25 Claims, 19 Drawing Sheets

Related U.S. Application Data of application No. 15/991,867, filed on May 29, 2018, and a continuation-in-part of application No. 15/914,789, filed on Mar. 7, 2018, now Pat. No. 10,204,456, and a continuation-in-part of application No. 15/914,789, filed on Mar. 7, 2018, now Pat. No. 10,204,456, and a continuation-in-part of application No. 15/914,812, filed on Mar. 7, 2018.

(60) Provisional application No. 62/590,556, filed on Nov. 25, 2017, provisional application No. 62/577,551, filed on Oct. 26, 2017, provisional application No. 62/520,127, filed on Jun. 15, 2017, provisional application No. 62/516,155, filed on Jun. 7, 2017, provisional application No. 62/511,657, filed on May 26, 2017, provisional application No. 62/468,044, filed on Mar. 7, 2017.

(51) Int. Cl.
| | |
|---|---|
| *G06T 19/00* | (2011.01) |
| *G06N 20/00* | (2019.01) |
| *A63B 69/36* | (2006.01) |
| *A63B 71/02* | (2006.01) |
| *A63B 71/06* | (2006.01) |
| *G02B 27/01* | (2006.01) |
| *G06T 7/20* | (2017.01) |
| *A63B 102/32* | (2015.01) |

(52) U.S. Cl.
CPC ........ *A63B 71/022* (2013.01); *A63B 71/0622* (2013.01); *G02B 27/0172* (2013.01); *G06F 3/012* (2013.01); *G06F 3/013* (2013.01); *G06N 20/00* (2019.01); *G06T 13/40* (2013.01); *G06T 19/006* (2013.01); *A63B 2071/0638* (2013.01); *A63B 2071/0666* (2013.01); *A63B 2102/32* (2015.10); *A63B 2220/30* (2013.01); *A63B 2220/806* (2013.01); *A63B 2220/807* (2013.01); *A63B 2220/833* (2013.01); *A63B 2220/836* (2013.01); *G02B 2027/014* (2013.01); *G06T 7/20* (2013.01); *G06T 2207/30196* (2013.01); *G06T 2207/30224* (2013.01)

(56) References Cited

U.S. PATENT DOCUMENTS

| | | |
|---|---|---|
| 9,839,828 B2 | 12/2017 | Leech et al. |
| 9,914,037 B2 | 3/2018 | Nordstrom |
| 2006/0116185 A1 | 6/2006 | Krull |
| 2007/0238539 A1 | 10/2007 | Dawe et al. |
| 2007/0298896 A1* | 12/2007 | Nusbaum ............... A63B 69/36 473/131 |
| 2011/0224027 A1 | 9/2011 | Edmondson |
| 2012/0004956 A1* | 1/2012 | Huston ................... H04W 4/21 705/14.1 |
| 2012/0007885 A1 | 1/2012 | Huston |
| 2013/0095924 A1 | 4/2013 | Geisner et al. |
| 2013/0117377 A1 | 5/2013 | Miller |
| 2013/0137076 A1 | 5/2013 | Perez et al. |
| 2013/0172093 A1 | 7/2013 | Leech |
| 2014/0038750 A1 | 2/2014 | Leech |
| 2014/0287806 A1 | 9/2014 | Balachandreswaran |
| 2015/0050629 A1 | 2/2015 | Pease et al. |
| 2015/0343294 A1* | 12/2015 | Leech ................ A63B 69/3608 473/209 |
| 2015/0373474 A1 | 12/2015 | Kraft et al. |
| 2015/0379351 A1 | 12/2015 | Dibenedetto et al. |
| 2016/0279516 A1* | 9/2016 | Gupta ................. A63F 13/5255 |
| 2016/0377864 A1 | 12/2016 | Moran et al. |
| 2017/0028299 A1* | 2/2017 | The ....................... G02B 27/017 |
| 2017/0142329 A1* | 5/2017 | Pelz ................... H04N 5/23219 |
| 2017/0151484 A1 | 6/2017 | Reilly et al. |
| 2017/0203172 A1* | 7/2017 | Ito .......................... A63B 69/36 |
| 2017/0203187 A1 | 7/2017 | Ito et al. |
| 2017/0263056 A1 | 9/2017 | Leppanen et al. |
| 2017/0296871 A1* | 10/2017 | Kiryu ................. G06Q 10/0639 |
| 2017/0340948 A1 | 11/2017 | Leech |
| 2018/0053284 A1 | 2/2018 | Rodriguez et al. |
| 2018/0065018 A1 | 3/2018 | Leech et al. |
| 2018/0256962 A1 | 9/2018 | Kudirka et al. |
| 2018/0261010 A1 | 9/2018 | Kudirka et al. |

OTHER PUBLICATIONS

International Search Report and Written Opinion dated Sep. 10, 2018 for PCT/US2018/036544.

International Search Report and Written Opinion dated May 7, 2018 for PCT/US2018/021323.

International Search Report and Written Opinion dated May 14, 2018 for PCT/US18/21317.

"Seriously Anything: Future", Youtube video clip accessible as of Mar. 7, 2017 at https://youtu.be/5rW0P3wbS4o, Ally Invest Securities LLC, apparently published on Sep. 11, 2017.

* cited by examiner

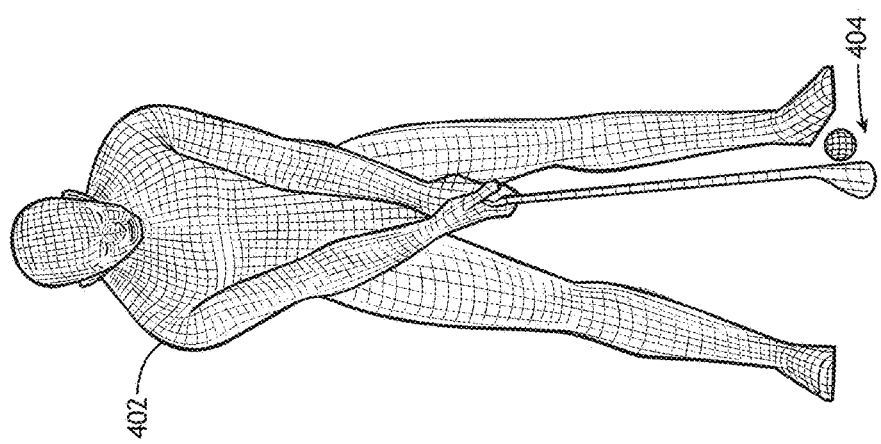

000# MIXED-REALITY GOLF TRACKING AND SIMULATION

CROSS-REFERENCE TO RELATED APPLICATION

The present application is a continuation-in-part of U.S. application Ser. No. 15/914,789, filed Mar. 7, 2018, entitled Mixed Reality Golf Simulation and Training System, which claims priority to U.S. Provisional Application Ser. No. 62/468,044 filed Mar. 7, 2017 and U.S. Provisional Application Ser. No. 62/577,551 filed Oct. 26, 2017. The present application is also a continuation-in-part of U.S. application Ser. No. 16/002,860 filed Jun. 7, 2018, entitled Mixed-Reality Sports Tracking and Simulation, which claims priority to U.S. application Ser. No. 15/991,867, filed May 29, 2018, entitled Mixed-Reality Kick Tracking and Simulation, which claims priority to U.S. application Ser. No. 15/914,789, filed Mar. 7, 2018, entitled Mixed Reality Golf Simulation and Training System, which claims priority to U.S. Provisional Application Ser. No. 62/468,044 filed Mar. 7, 2017 and U.S. Provisional Application Ser. No. 62/577,551 filed Oct. 26, 2017. U.S. application Ser. No. 15/991,867 also claims priority to U.S. application Ser. No. 15/914,812, filed Mar. 7, 2018, entitled Mixed Reality Sport Simulation and Training System, which claims priority to U.S. Provisional Application Ser. No. 62/511,657 filed May 26, 2017, U.S. Provisional Application No. 62/516,155 filed Jun. 7, 2017, U.S. Provisional Application No. 62/520,127 filed Jun. 15, 2017, and U.S. Provisional Application Ser. No. 62/590,556 filed Nov. 25, 2017. U.S. application Ser. No. 15/991,867 also claims priority to U.S. Provisional Application Ser. No. 62/511,657, filed May 26, 2017; U.S. Provisional Application Ser. No. 62/590,556, filed Nov. 25, 2017; U.S. Provisional Application Ser. No. 62/520,127, filed Jun. 15, 2017; and U.S. Provisional Application Ser. No. 62/577,551, filed Oct. 26, 2017. U.S. application Ser. No. 16/002,860 also claims priority to U.S. Provisional Application Ser. No. 62/516,155, filed Jun. 7, 2017, entitled Augmented Reality Baseball Simulation and Training System; U.S. Provisional Application Ser. No. 62/520,127, filed Jun. 15, 2017, entitled Augmented Reality Soccer Simulation and Training System; and U.S. Provisional Application Ser. No. 62/590,556, filed Nov. 25, 2017, entitled Augmented Reality Football Kick Simulator.

All of the above-listed applications are incorporated herein by reference in their entirety.

TECHNICAL FIELD

The present disclosure relates generally to golf simulation and, more particularly, to a mixed-reality golf simulation and training system.

BACKGROUND

Golfers typically train to perform multiple types of shots with a variety of club types. For example, golfers typically carry multiple types of clubs such as, but not limited to woods (e.g., drivers, fairway woods, or the like), irons, hybrids, wedges, and/or putters. Further, each type of club may include multiple variations (e.g., numbered woods, numbered irons, numbered hybrids, or the like) designed to provide different launch angles and/or ball trajectories. Each type of club typically has a unique combination of shaft length, face angles, or the like. Accordingly, each type of club typically requires a different technique to achieve a desired trajectory (e.g., speed, distance, and/or rotation). Small changes in a golfer's technique may affect factors such as the launch angle, initial velocity, or rotation that may significantly impact the trajectory of the ball and thus whether a shot is deemed successful. Golfers thus often train in practice ranges and/or on courses to view the motion of the ball as feedback and attempt to adjust their techniques.

However, course practice (e.g., on a range or a golf course) alone is not always practical and may be insufficient to diagnose issues with technique. For example, field practice may be limited by weather or access to facilities. By way of another example, simply viewing a trajectory of a ball in the real world during field practice may provide limited feedback for correcting or modifying technique. For instance, merely observing an issue (e.g., hooking of the ball, inconsistent swings, or the like) may be insufficient to solve the problem. By way of another example, course practice may fail to provide statistical information about a given shot or how a given shot compares to other shots made by the player in the past. By way of a further example, it may be difficult to accurately observe the trajectory of a golf ball with the naked eye.

Therefore, it may be desirable to provide systems and methods to cure the deficiencies identified above.

SUMMARY

A mixed-reality golf simulation system is disclosed in accordance with one or more illustrative embodiments of the present disclosure. In one illustrative embodiment, the system includes a ball-tracking sub-system configured to generate ball-tracking data when a golf ball is hit by a user. In another illustrative embodiment, the system includes a near-eye display with a partially-transparent display element configured to display mixed-reality virtual objects displayed over physical objects within a user field of view. In another illustrative embodiment, the near-eye display includes a user input device. In another illustrative embodiment, the near-eye display includes one or more head orientation sensors to determine a head orientation of the user. In another illustrative embodiment, the system includes a storage device to store panoramic images of a hole of a golf course from a plurality of locations along the hole in which the panoramic images are associated with location coordinates of the plurality of locations along the hole. In another illustrative embodiment, the system includes a controller communicatively coupled to the ball-tracking sub-system and the near-eye display. In another illustrative embodiment, the controller directs the near-eye display to display, based on a head orientation of the user received from the near-eye display, a mixed-reality environment including a virtual reality scene from the perspective of a first location on the hole over at least a portion of the user field of view when the user is looking in one or more selected directions and at least a partially unobstructed real-world view through the partially-transparent display element when the user is looking at a location from which the ball is to be hit, where the virtual reality scene from the perspective of the first location includes images from the storage device associated with location coordinates of the first location. In another illustrative embodiment, the controller receives ball-tracking data of a ball hit by the user in real-time from the ball-tracking sub-system, where the ball-tracking data includes a first landing location of the ball associated with a first shot. In another illustrative embodiment, the controller directs the near-eye display to display, based on a head orientation of the user received from the near-eye display, the mixed-reality environment including a virtual reality scene from the perspective of the first landing location of the ball over at least a portion of the user field of view. In another illustrative embodiment, the virtual reality scene from the perspective of the first landing location of the ball includes images from the storage device associated with location coordinates of the first landing location of the ball. In another illustrative embodiment, the controller receives ball-tracking data of a ball hit by the user in real-time from the ball-tracking sub-system, wherein the ball-tracking data includes a second landing location of the ball associated with a second shot.

A mixed-reality golf simulation system is disclosed in accordance with one or more illustrative embodiments of the present disclosure. In one illustrative embodiment, the system includes a ball-tracking sub-system configured to generate ball-tracking data for golf balls hit by a user. In another illustrative embodiment, the system includes a near-eye display with a partially-transparent display element configured to display mixed-reality virtual objects displayed over physical objects within a user field of view. In another illustrative embodiment, the system includes a controller communicatively coupled to the ball-tracking sub-system and the near-eye display. In another illustrative embodiment, the controller directs the near-eye display to display, based on a head orientation of the user received from the near-eye display, a mixed-reality environment including virtual objects within at least a portion of the user field of view when the user is looking in one or more selected directions and at least a partially unobstructed real-world view through the partially-transparent display element when the user is looking at a location from which the ball is to be hit. In another illustrative embodiment, the controller receives ball-tracking data for a plurality of balls hit by the user with a first club type of two or more club types. In another illustrative embodiment, the controller receives ball-tracking data for a plurality of balls hit by the user with at least a second club type of the two or more club types. In another illustrative embodiment, the controller trains a club selector to select a club for the user based on the ball-tracking data associated with the first club type and the ball-tracking data associated with the at least a second club type. In another illustrative embodiment, the controller selects a club for the user from any of the two or more club types based on a distance to a pin with the club selector.

A mixed-reality golf simulation system is disclosed in accordance with one or more illustrative embodiments of the present disclosure. In one illustrative embodiment, the system includes a ball-tracking sub-system configured to generate ball-tracking data when a golf ball is hit by a user. In another illustrative embodiment, the system includes a user-tracking sub-system configured to generate user-tracking data when the golf ball is hit by the user. In another illustrative embodiment, the system includes a near-eye display with a partially-transparent display element configured to display mixed-reality virtual objects displayed over physical objects within a user field of view. In another illustrative embodiment, the near-eye display includes a user input device. In another illustrative embodiment, the near-eye display includes one or more head orientation sensors to determine a head orientation of the user. In another illustrative embodiment, the system includes a controller communicatively coupled to the ball-tracking sub-system and the near-eye display. In another illustrative embodiment, the controller directs the near-eye display to display, based on a head orientation of the user received from the near-eye display, a mixed-reality environment including virtual objects within at least a portion of the user field of view when the user is looking in one or more selected directions and at least a partially unobstructed real-world view through the partially-transparent display element when the user is looking at a location from which the ball is to be hit. In another illustrative embodiment, the controller receives ball-tracking data of a ball hit by the user in real-time from the ball-tracking sub-system. In another illustrative embodiment, the controller receives user-tracking data of the user as the ball is hit by the user in real-time from the user-tracking sub-system, where the user-tracking data is indicative of a motion of the user as the ball is hit by the user. In another illustrative embodiment, the controller directs the near-eye display to display virtual objects in the mixed-reality display environment including a virtual avatar simulating the motion of the user as the ball is hit by the user, where the virtual avatar is a three-dimensional virtual object viewable from multiple angles by the user in the mixed-reality environment.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which:

FIG. 4 is a perspective view of an avatar representing a user during a swing, in accordance with one or more embodiments of the present disclosure.

DETAILED DESCRIPTION

Figure 1A:
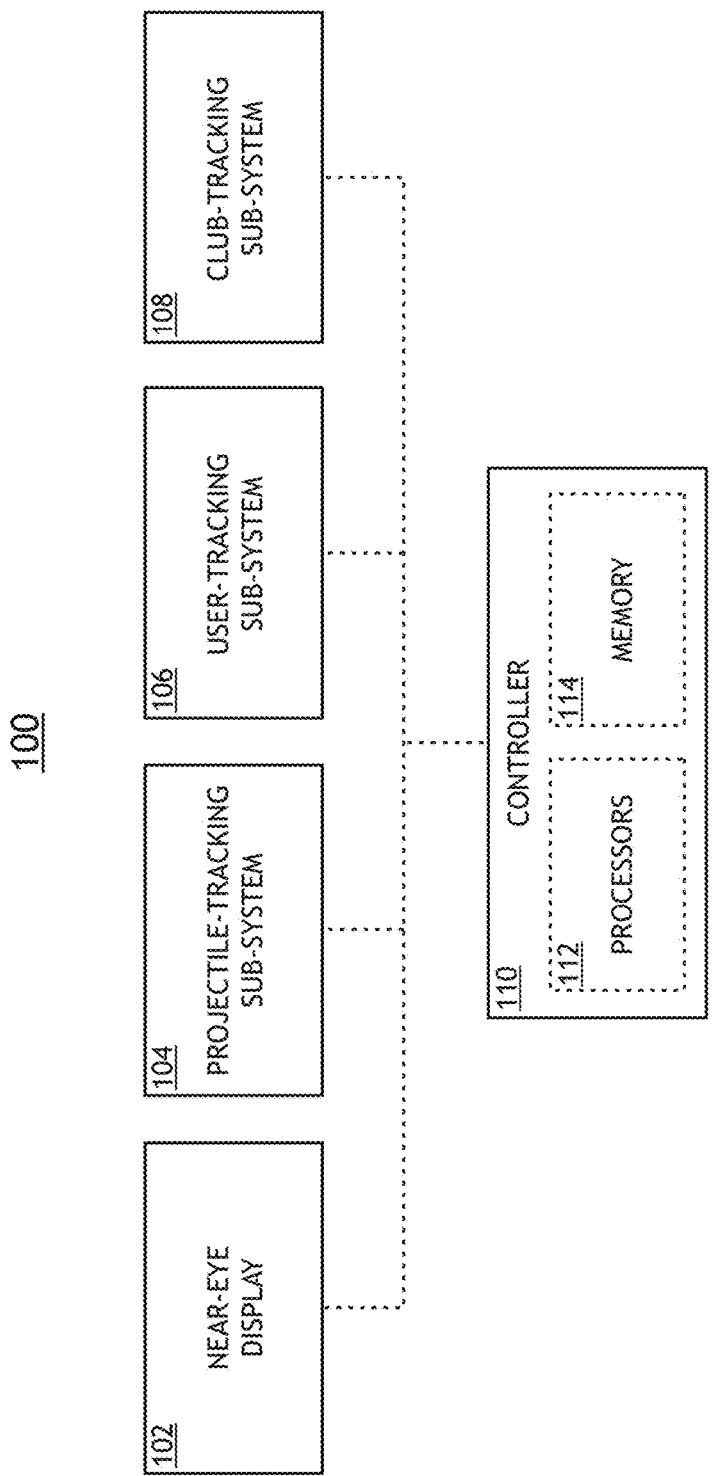
FIG. 1A is a block diagram of components of a mixed-reality golf simulator, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a mixed-reality golf simulation and training system (e.g., a mixed-reality golf simulator). For example, a mixed-reality golf simulator may include a mixed-reality display device coupled to a ball-tracking system including one or more sensors internal to or external to a ball suitable for tracking the ball during and after a shot. Further, the mixed-reality golf simulator may include one or more additional tracking systems to track one or more additional aspects of a shot. For example, the mixed-reality golf simulator may include a user-tracking system including one or more sensors suitable for monitoring the motion of the user during the action. By way of another example, the mixed-reality golf simulator may include a club-tracking system to track the motion of a club during a swing.

In some embodiments, a user may hit a ball and immediately view relevant data about the mechanics of the action as well as the resulting trajectory. For example, a mixed-reality golf simulator may provide relevant data obtained from the ball-tracking system such as, but not limited to, launch speed, launch angle, hook angle, travel distance, hang time, rotation, or location of impact. In some embodiments, a user may hit a ball into a net or other containment device and view a virtual ball moving along a predicted trajectory within a virtual scene such as a virtual golf course on tracking data over a partial trajectory. Accordingly, the user may receive immediate visual and data-driven feedback without requiring the user to be physically present at driving range or a course.

Additional embodiments of the present disclosure are directed to a near-eye display with a wearable form-factor. For example, a mixed-reality display device may include mixed-reality glasses providing a partially transmissive surface through which a real-world view of physical objects such as the ball may be viewed as well as an interface for displaying virtual objects to the user. By way of another example, a mixed-reality display device may include mixed-reality contact lenses. The mixed-reality golf simulator may thus be portable and may be suitable for use at a location convenient to the user.

The term "mixed-reality" in the present disclosure refers to a visualization technique in which virtual objects are displayed over at least a portion of a field of view of a user. Mixed-reality may encompass a broad range of technologies in which the relative predominance of virtual objects versus physical objects (e.g., objects seen directly with a user's eyes) varies across a spectrum. On one end of the mixed-reality spectrum, commonly referred to as augmented reality (AR), virtual objects are displayed over or are otherwise integrated along with a real-world view of user. In this regard, a field of view may be primarily filled with physical objects seen directly by the user, and virtual objects may be integrated with or interact with the physical objects. On an opposite end of the mixed-reality spectrum, commonly referred to as virtual reality (VR), a field of view is completely obstructed by a virtual scene such that a user is immersed within the virtual scene. Various mixed-reality technologies may further blend virtual and physical objects in a wide range of techniques and user experiences.

Virtual objects may have any degree of transparency to a user. For example, a virtual object may be partially transparent such that physical objects may be partially visible through the virtual object. Accordingly, partially transparent virtual objects may be, but are not required to be, used as guides. By way of another example, a virtual object may be opaque and obstruct a portion of a field of view. In this regard, opaque virtual objects may replace physical objects within a portion of a field of view with virtual objects and may be, but are not required to be, used to provide an immersive scene to a user.

A mixed-reality golf simulator may display virtual objects in various ways with respect to physical objects visible to the user. For example, a virtual object may be head-locked such that the size, shape, or orientation may remain fixed in the field of view of the user regardless of the orientation or gaze direction of the user. In one instance, ball-tracking data (launch angle, travel distance, rotations, hang time, landing location, or the like) may be displayed as head-locked virtual objects to facilitate readability. In another instance, logos and/or selection menus may be displayed as head-locked virtual data.

By way of another example, a mixed-reality golf simulator may display a virtual object within a virtual coordinate system designed to replicate the real-world view of the user. In this regard, virtual objects may be scaled, rotated, or transformed such that virtual objects at a selected distance in the virtual coordinate system appear integrated with physical objects in the real-world view at the same distance. Further, the virtual objects may be continually updated to reflect the head orientation and/or gaze direction of the user. In some cases, a user may not perceive a difference between a physical object and a virtual object in a mixed-reality environment. Additionally, virtual objects may be placed within the virtual coordinate system at selected relative distances from each other or may be anchored to physical coordinates (e.g., global positioning system (GPS) coordinates, latitude and longitude coordinates, or the like). For instance, virtual objects representing bases of a baseball diamond, field markings, or the like may be located at fixed distances from each other in the virtual coordinate system and displayed to the user based on the location of the user within the virtual coordinate system (e.g., a location on a virtual field). Accordingly, as the user moves in the physical world, virtual objects in the mixed-reality environment may be correspondingly updated. In another instance, a configuration of a virtual field may be anchored to a particular physical location. In this regard, a user may define and associate a customizable virtual environment with a location often visited by the user. Accordingly, the mixed-reality golf simulator may display the elements of the virtual environment any time the user visits the location.

Additional embodiments of the present disclosure are directed to a mixed-reality golf simulator with user-selectable display settings to configure a mixed-reality environment for display before or after a shot. For example, a user in an open field such as a driving range may selectively display virtual objects depicting a fairway, rough, traps (e.g., sand and/or water traps, a green, or a pin). In this regard, the virtual objects may be, but are not required to be, characterized as AR objects that coexist with physical objects such as the tee box within the real-world view of the user. Further, the mixed-reality golf simulator may continuously adjust the sizes and orientations of the virtual objects based on the head orientation and/or lines of sight associated with a field of view of the user to maintain integration with the surrounding physical objects. By way of another example, a user may selectively display an opaque virtual scene representing a virtual course (e.g., a local course or a remote course). In this regard, the virtual objects may be, but are not required to be, characterized as virtual-reality (VR) objects. Accordingly, the mixed-reality golf simulator may provide an immersive audio/visual experience.

Additional embodiments of the present disclosure are directed to a mixed-reality golf simulator with user-selectable data to be displayed on the mixed-reality display. For example, a ball-tracking system may include cameras and/or sensors to track various aspects of the ball such as, but not limited to, position, velocity, acceleration, direction, launch angle, or rotation for a selected period of time (e.g., a launch window). The mixed-reality golf simulator may then display raw or processed data from the ball-tracking system to the user as virtual objects. The user may then, for example, utilize the data to analyze and make adjustments to technique. In one instance, a user on a driving range may perform one or more shots with any selected clubs and the mixed-reality golf simulator may provide relevant data associated with the shots to the user as virtual objects. In another instance, the mixed-reality golf simulator may track data associated with shots made with different club types. In this regard, the mixed-reality golf simulator may provide club-relevant statistics associated with the user (e.g., launch angle, loft height, distance travelled, hook angle, or the like). Such statistics may be provided to the user for training purposes or to guide club selection when playing a game.

Additional embodiments of the present disclosure are directed to tracking the trajectory of the ball over a limited period of time (e.g., a launch window) and displaying a predicted a trajectory of the ball after the launch window. By way of another example, the mixed-reality golf simulator may display a virtual ball travelling across a predicted may trajectory determined based on data from the ball-tracking system. In this regard, a user may hit a ball in a constrained environment such as a net or a screen and view simulated motion of the ball in a mixed-reality environment through a complete (predicted) trajectory. Further, the mixed-reality golf simulator may optionally display all or part of the predicted trajectory of the ball by a persistent or semi-persistent arc (e.g., a comet tail, or the like).

Additional embodiments of the present disclosure are directed to a mixed-reality golf simulator with a user-tracking system. For example, a user-tracking system may include one or more sensors worn by or external to a user to track aspects of a user's motion prior to and during a swing such as, but not limited to, foot placement, arm position, shoulder position, head angle, elbow angle, arm speed, or point of impact of a ball during a hit. The user-tracking data may thus be integrated with the ball-tracking data from the ball-tracking system to provide additional feedback to the user.

Additional embodiments of the present disclosure are directed to a mixed-reality golf simulator with a club-tracking system. For example, the club-tracking system may include one or more sensors to track the trajectory of a club such as, but not limited to, club speed, club trajectory, or point of impact of a projectile during a hit. The user-tracking data may thus be integrated with the ball-tracking data from the projectile-tracking system to provide additional feedback to the user.

Additional embodiments of the present disclosure are directed to displaying a mixed-reality environment within a selected range of line of sight directions (e.g., view directions, view vectors, gaze directions, gaze vectors, or the like). It is recognized herein that it may be desirable for a golfer to have an unobstructed real-world view at selected times or viewing angles.

In one embodiment, virtual objects displayed by the mixed-reality golf simulator are bounded to a selected range of view directions. In this regard, a user may view virtual objects (e.g., tracking data, a trajectory (real or predicted) virtual elements of a mixed-reality scene, or the like) when looking in selected directions and may view an at least partially unobstructed real-world view when looking in other directions. In one instance, the mixed-reality golf simulator may provide a transparent or unobstructed view to the ball when a user's head is facing downwards or towards the ball and may then transition into a mixed-reality scene as the user looks forward. Accordingly, a user may iteratively look up in a direction of a shot to view virtual objects (e.g., augmented reality objects associated with a course, an immersive virtual scene, or the like) and may look down to see an unobstructed real-world view (e.g., of the ball, the user's feet, a club, or the like) to line up a shot. Similarly, trajectory and/or ball-tracking data may be displayed in real-time after a shot.

Additional embodiments of the present disclosure are directed to displaying a mixed-reality environment only at selected times (e.g., during or after a shot). For example, the mixed-reality golf simulator may provide an unobstructed real-world view prior to a shot (e.g., to allow the user to set up and prepare for the shot) and may display one or more virtual objects after the shot. In this regard, a user may execute a shot with minimal distractions in a natural environment, but may view any selected virtual objects after the shot to provide a mixed-reality simulation experience. In one instance, a user may execute shots with an unobstructed real-world view and may view virtual objects such as, but not limited to, a trajectory of the ball and/or selected trajectory data (e.g., from the ball-tracking system, the user-tracking system, and/or the club-tracking system) in real-time after the shot.

Additional embodiments of the present disclosure are directed to a mixed-reality golf simulator including guided user coaching using any combination of audio and mixed-reality visualizations. For example, a mixed-reality projectile-tracking simulator may provide coaching suggestions to a user on various techniques, suggest body positions, or the like. For instance, a mixed-reality projectile-tracking simulator may provide guides for the user such as, but not limited to, guides for suggested body positions, body movements, club movements, or ball trajectories. In this regard, the user may be provided suggested techniques for accomplishing certain types of shots (e.g., drives, pitching onto a green, hitting out of a sand trap, or the like). Further, the coaching suggestions may be based on data from the ball-tracking system and/or the user-tracking system for a single shot or based on an analysis of historical data. It is recognized herein that while certain fundamental aspects of a swinging technique may be relevant to all or most users, it may be the case that certain technical aspects may vary between users such that coaching suggestions may be personalized. Accordingly, a mixed-reality golf simulator may generate correlations between aspects of user motion and corresponding trajectories over time based on historical data tracked and stored by the system to develop customized feedback for individual users.

Additional embodiments of the present disclosure are directed to providing mixed-reality feedback to the user. For example, a mixed-reality golf simulator may utilize data from the user-tracking system and/or the ball-tracking system to capture and subsequently replay user and ball motion. In one instance, the mixed-reality golf simulator may display a 3D avatar of the user performing selected shots in mixed-reality. Accordingly, a user may save and later view a saved shot in a 3D mixed-reality environment such that the user may walk around the avatar and view the motion of the user's body and/or the motion of the ball from a variety of angles. It is recognized herein that viewing saved shots in a 3D mixed-reality environment may provide useful feedback to the user. For example, a user may save and review successful attempts to determine what techniques work well and what techniques do not.

Additional embodiments of the present disclosure are directed to a mixed-reality golf simulator providing multi-person support. Multiple users with mixed-reality golf simulators may thus interact with each other in virtual environments. Further, the multiple users may be located close to each other (e.g., on the same course or range) or may be located remotely. For example, the multiple mixed-reality golf simulators may provide a common virtual environment that is viewed by each user according to its location within the virtual environment. Further, avatars associated with each user may be displayed in the mixed-reality environment. In this regard, the multiple users may interact in a multitude of ways. For instance, the users may take turns making shots such that the motion of virtual balls may be visible to all users. In another instance, the users may coach each other based on performance in the virtual environment. In another instance, the users may play a multi-player game. Further, the game may be completely virtualized (e.g., users may play on a virtualized course by hitting into nets or open ranges and the real or predicted motion of the balls may be displayed to all users as virtual objects on the virtual course) or the game may be played in augmented reality (e.g., players on a physical golf course may view the trajectories and/or statistics of the other players as augmented reality virtual objects). By way of another example, the mixed-reality golf simulator may provide virtual players to provide a computer-simulated gaming experience. For example, the mixed-reality golf simulator may display virtual players that may perform shots at a selected skill level.

Additional embodiments of the present disclosure are directed to a mixed-reality golf simulator having multiple user-selectable operational modes. The operational modes may include pre-defined selections of various display and/or operational settings. For example, an operational mode may include a pre-defined virtual environment such as, but not limited to, aspects of a mixed reality scene (e.g., virtual objects representing a green, a fairway, a rough, traps, or the like). By way of another example, an operational mode may include a pre-defined set of tracking data (e.g., ball-tracking data, user-tracking data, club-tracking data, or the like) to display as virtual objects.

In some embodiments, a mixed-reality golf simulator includes a virtual range mode. For example, the virtual range mode may provide a mixed reality environment for a user to make multiple shots and to display trajectory and/or tracking data associated with the shots. In this regard, the virtual range mode may be, but is not required to be, suitable for user training and/or coaching. A virtual range mode may be utilized in multiple settings. For instance, the virtual range mode may be utilized in an open field (e.g., a driving range, or the like) in which the actual trajectory of hit balls may be tracked over any selected range. In another instance, the virtual range mode may be utilized in a constrained environment in which a ball is hit into a containment device (e.g., a net, a screen, or the like), partial trajectory information is generated over a launch window, and predicted trajectory information is generated based on the partial trajectory information.

The virtual range mode may provide the user with any user-selected type of mixed reality environment. For example, the virtual range mode may include one or more user-selected augmented-reality elements (e.g., virtual objects integrated with real-world objects directly visible through the near-eye display). By way of another example, the virtual range mode may provide the user with an immersive virtual reality scene such as, but not limited to a virtual golf course. In this regard, the user may play one or more holes of a selected golf course from any remote location.

The virtual range mode may further provide multi-player support. In this regard, multiple players having near-eye displays may view the actions of each other including shots as well as tracked body or club movements. Additionally, the multiple players may be physically together or remote from each other. For example, multiple players may play a virtual course together, may play a target practice game against each other, may view shots and/or provide coaching assistance to other players, or the like.

In some embodiments, a mixed-reality golf simulator includes a virtual caddy mode suitable for augmenting the experience of play on a real-world golf course. For example, the virtual caddy mode may track shots performed on the real-world course and display information (e.g., as augmented-reality virtual objects) such as, but not limited to, trajectories of shots and landing locations of shots. By way of another example, the virtual caddy mode may assist a user in performing shots.

In some embodiments, a mixed-reality golf simulator includes a virtual instructor mode to provide guided user coaching using any combination of audio and mixed-reality visualizations. For example, a mixed-reality projectile-tracking simulator may provide coaching suggestions to a user on various techniques, suggest body positions, or the like. The virtual instructor mode may further provide mixed-reality feedback to the user. For example, a mixed-reality golf simulator may utilize data from the user-tracking system and/or the ball-tracking system to capture and subsequently replay user and ball motion in a mixed-reality environment that enables the user to view the motion from multiple angles.

Referring now to FIGS. 1A through 3C, a mixed-reality golf simulator 100 is described in accordance with one or more embodiments of the present disclosure.

FIG. 1A is a block diagram of components of a mixed-reality golf simulator 100, in accordance with one or more embodiments of the present disclosure.

In one embodiment, a mixed-reality golf simulator 100 includes a mixed-reality near-eye display 102 to display virtual objects within the field of view of a user. In another embodiment, a mixed-reality golf simulator 100 includes a ball-tracking sub-system 104 configured to monitor one or more aspects of a ball after a shot such as, but not limited to, location, velocity, acceleration, vertical launch angle, horizontal launch angle, hook angle, flight time, rotation (e.g., spin axis, rotation speed), distance travelled (e.g., carry distance and/or roll distance), or landing location. In another embodiment, the mixed-reality golf simulator 100 includes a user-tracking sub-system 106 configured to monitor one or more aspects of swing motion such as, but not limited to, club speed, club acceleration, club trajectory (e.g., swing plane horizontal, swing plane vertical), an impact location on the ball, club face orientation during impact, face to path, face to target, angle of attack, or spin loft. In another embodiment, the user-tracking sub-system 106 is at least partially integrated with the ball-tracking sub-system 104. In another embodiment, the mixed-reality golf simulator 100 includes a club-tracking sub-system 108 configured to monitor one or more aspects of motion of user equipment (e.g., a bat, a racquet, a stick, or the like) during a swing such as, but not limited to, a swing speed or a swing trajectory. The club-tracking sub-system 108 may be formed as a standalone device or may be incorporated into another component such as, but not limited to, the user-tracking sub-system 106.

In another embodiment, the mixed-reality golf simulator 100 includes a controller 110. In another embodiment, the controller 110 includes one or more processors 112 configured to execute program instructions maintained on a memory medium 114. In this regard, the one or more processors 112 of controller 110 may execute any of the various process steps described throughout the present disclosure.

The one or more processors 112 of a controller 110 may include any processing element known in the art. In this sense, the one or more processors 112 may include any microprocessor-type device configured to execute algorithms and/or instructions. It is further recognized that the term "processor" may be broadly defined to encompass any device having one or more processing elements, which execute program instructions from a non-transitory memory medium 114. For example, the processors 112 may include one or more microprocessors, microcontrollers, or the like. By way of another example, the processors 112 may include hardwired logic circuitry such as, but not limited to, one or more application-specific integrated circuits (ASICs), programmable logic devices (PLDs), or field programmable gate arrays (FPGAs).

The memory medium 114 may include any storage medium known in the art suitable for storing program instructions executable by the associated one or more processors 112. For example, the memory medium 114 may include a non-transitory memory medium. By way of another example, the memory medium 114 may include, but is not limited to, a read-only memory (ROM), a random-access memory (RAM), a magnetic or optical memory device (e.g., disk), a magnetic tape, a solid-state drive, and the like. It is further noted that memory medium 114 may be housed in a common controller housing with the one or more processors 112. In one embodiment, the memory medium 114 may be located remotely with respect to the physical location of the one or more processors 112 and controller 110. For instance, the one or more processors 112 of controller 110 may access a remote memory (e.g., server), accessible through a network (e.g., internet, intranet, and the like). Therefore, the above description should not be interpreted as a limitation on the present invention but merely an illustration.

The controller 110 may be communicatively coupled to various components of the mixed-reality golf simulator 100 such as, but not limited to, the near-eye display 102, the ball-tracking sub-system 104, the user-tracking sub-system 106, or the club-tracking sub-system 108 to carry out steps described throughout the present disclosure. For example, the controller 110 may receive data from the ball-tracking sub-system 104, the user-tracking sub-system 106, and/or the club-tracking sub-system 108 associated with a user or club action, process and/or analyze the data, generate a predicted trajectory of the ball, and direct the near-eye display 102 to display virtual objects representing the motion of the ball along the predicted trajectory to the user. By way of another example, the controller 110 may receive image, video, and/or audio data from the near-eye display 102 including physical objects within a field of view of the user, generate a mapping of the physical objects, render virtual objects within a virtual coordinate system to integrate with the physical objects, and direct the near-eye display 102 to display the virtual objects.

The steps described throughout the present disclosure may be carried out by a single controller 110 or, alternatively, multiple controllers. Additionally, the controller 110 may include one or more controllers housed in a common housing or within multiple housings. For example, the controller 110 may be integrated within and/or distributed within any number of components within the mixed-reality golf simulator 100. In this regard, various processing tasks required to perform steps described throughout the present disclosure may be distributed to suitable components based on factors such as, but not limited to, processing power, memory, or physical space requirements of any component in the mixed-reality golf simulator 100.

In one embodiment, the controller 110 may be fully or partially integrated into the near-eye display 102. In another embodiment, the controller 110 is at least partially distributed to additional components of the mixed-reality golf simulator 100 such as the ball-tracking sub-system 104 or the user-tracking sub-system 106. For example, it may be the case that the additional system components may have increased processing and/or memory capabilities such that the performance of the mixed-reality golf simulator 100 may be improved by offloading at least a portion of processing steps described throughout the present disclosure. In another embodiment, the controller 110 is at least partially distributed to a mobile computing device such as, but not limited to, a mobile phone, a tablet computing device, or a laptop communicatively coupled to or integrated within the mixed-reality golf simulator 100.

Figure 1B:
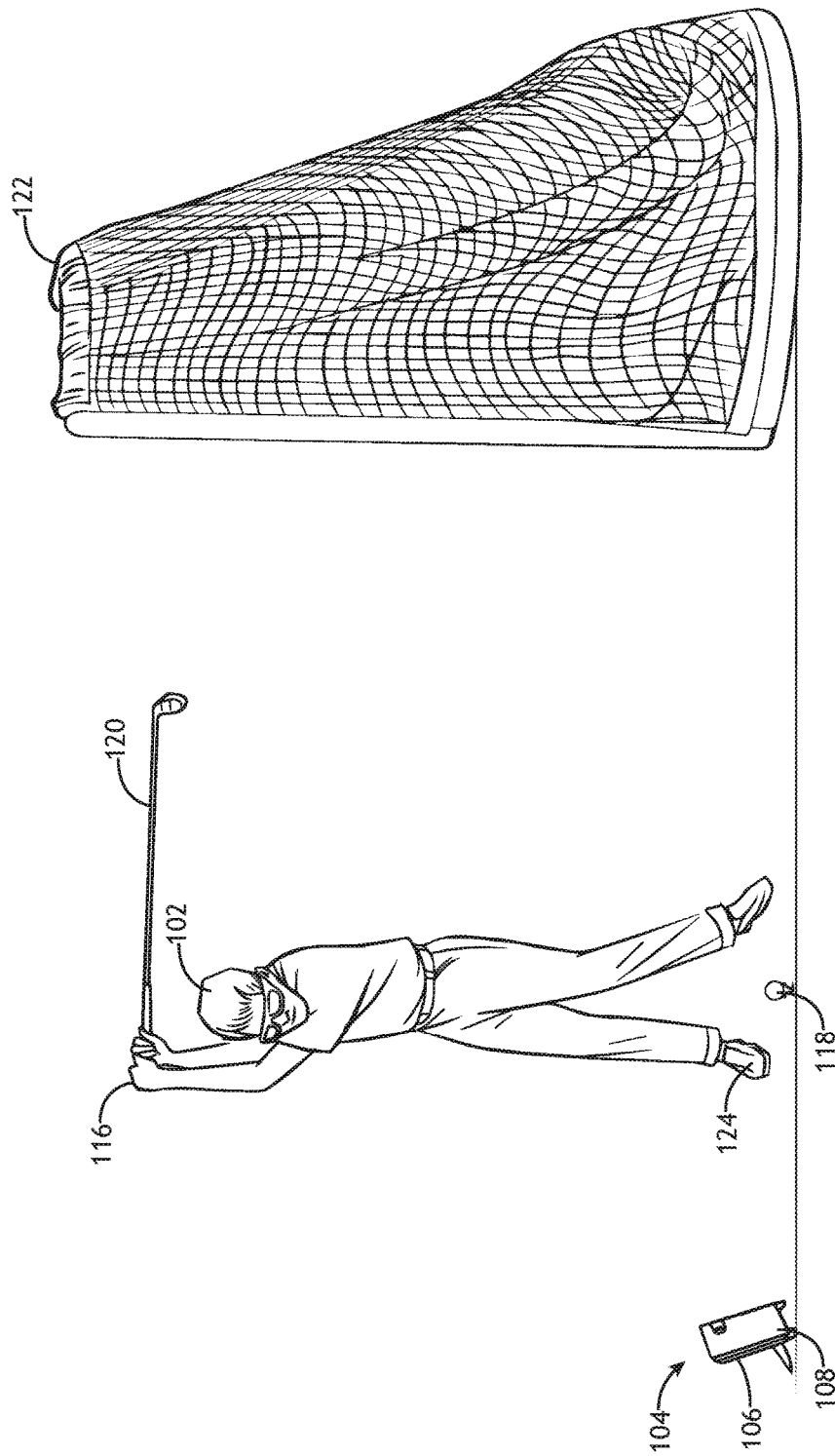
FIG. 1B is a conceptual view of a user wearing a near-eye display and hitting a ball with a club, in accordance with one or more embodiments of the present disclosure.

Referring now to FIGS. 1B through 3C, the interaction of a user 116 with the mixed-reality golf simulator 100 is illustrated in accordance with one or more embodiments of the present disclosure. FIG. 1B is a conceptual view of a user 116 wearing a near-eye display 102 and hitting a ball 118 with a club 120, in accordance with one or more embodiments of the present disclosure. In one embodiment, the user 116 hits the ball 118 in a constrained environment such that the trajectory of the ball 118 is at least partially limited by a containment device (e.g., a net 122, a screen (not shown), or the like).

In another embodiment, the ball-tracking sub-system 104 is positioned to track the ball 118 during a shot and throughout a launch window. For example, the ball-tracking sub-system 104 may track one or more aspects of the ball 118 (e.g., location, velocity, acceleration, rotation, or the like) until the motion of the ball 118 is impeded by the containment device. In another embodiment, the user-tracking sub-system 106 is positioned to track the motion of the user 116 during a shot. In another embodiment, the club-tracking sub-system 108 is positioned to track the motion of the club 120 during a shot. In another embodiment, a user 116 wears the near-eye display 102 while hitting the ball 118. In this regard, the near-eye display 102 may display a mixed-reality environment to the user 116 in which one or more virtual objects are displayed within the real-world view of the user 116. For example, the near-eye display 102 may display a virtual ball travelling along a predicted trajectory in the mixed-reality scene based on data from the ball-tracking sub-system 104 over the launch window. By way of another example, the near-eye display 102 may display virtual objects such as, but not limited to, ball-tracking data, user-tracking data, club-tracking data, coaching feedback, avatars representing the user, virtual players, additional users of connected systems, or the like.

It is to be understood that the mixed-reality golf simulator 100 is not limited to hitting the ball 118 into a containment device. In one embodiment, the user 116 may hit the ball 118 in an open area (e.g., a driving range, an open field, or the like) and the mixed-reality golf simulator 100 (e.g. via the ball-tracking sub-system 104) may generate ball-tracking data for a complete trajectory. Further, the near-eye display 102 may display ball-tracking data, coaching feedback, avatars representing the user and/or additional users, or the like based on the ball-tracking data over the complete trajectory.

Figure 2A:
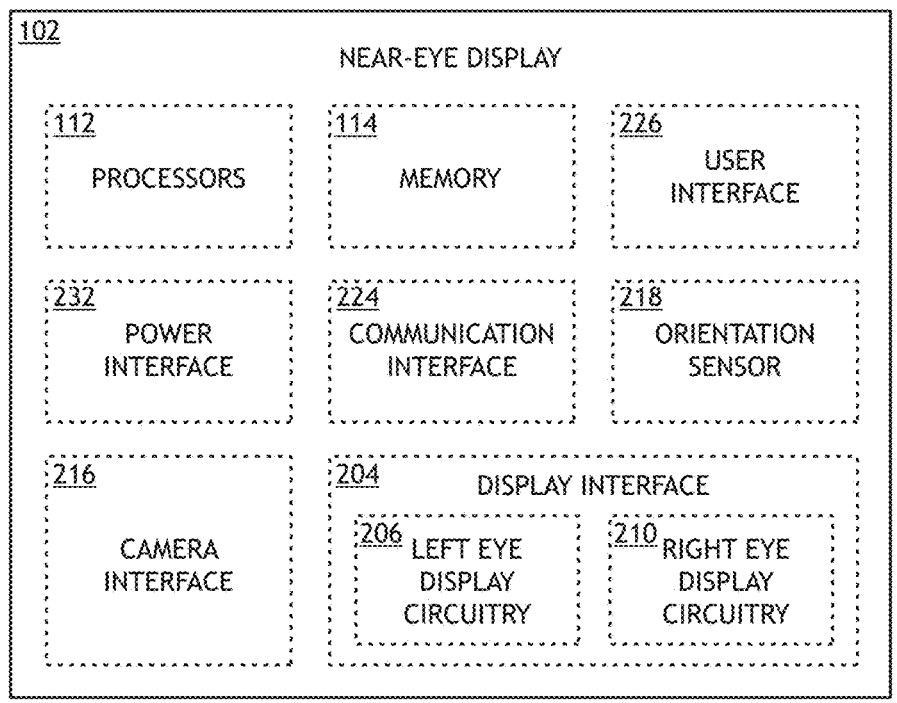
FIG. 2A is a block diagram of components of a near-eye display, in accordance with one or more embodiments of the present disclosure.
Figure 2B:
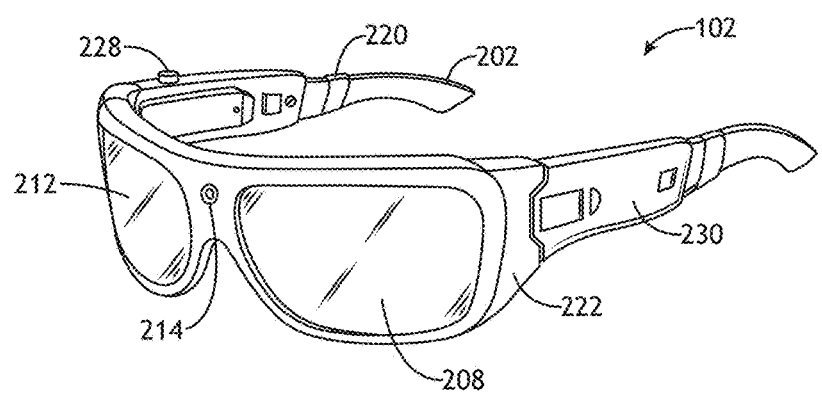
FIG. 2B is a perspective view of mixed-reality glasses including a near-eye display, in accordance with one or more embodiments of the present disclosure.

The near-eye display 102 may include any type of mixed-reality display known in the art. Further, the near-eye display 102 may have any form-factor suitable for displaying mixed-reality virtual objects to the user such as, but is not limited to, an eyeglass display device, contact lens display devices, a headset display device, or the like. In addition, the near-eye display 102 may be formed using custom components or may be formed at least in part using off-the-shelf components. For example, commercially-available near-eye displays suitable for integration within the mixed-reality golf simulator 100 may include, but are not limited to, a Microsoft HoloLens or an ODG R-9. FIG. 2A is a block diagram of components of a near-eye display 102, in accordance with one or more embodiments of the present disclosure. FIG. 2B is a perspective view of mixed-reality glasses 202 including a near-eye display 102, in accordance with one or more embodiments of the present disclosure. It is recognized herein that mixed-reality glasses including a near-eye display 102 may provide a light-weight mixed-reality interface suitable for a wide range of conditions and practice environments.

In one embodiment, the near-eye display 102 includes one or more processors 112 and/or a memory medium 114. In this regard, the controller 110 may be at least partially integrated within the near-eye display 102. For example, processors 112 of the near-eye display 102 may perform various processing tasks described throughout the present disclosure such as, but not limited to, identifying physical objects within a field of view of the user or rendering virtual objects for display to the user 116 based on a field of view and/or a gaze direction of the user 116.

In another embodiment, the near-eye display 102 includes a display interface 204 including left-eye display circuitry 206 configured to drive a left-eye display element 208 and right-eye display circuity 210 configured to drive a right-eye display element 212. In this regard, the display interface 204 may selectively display virtual objects to the left and/or the right eye of the user 116. For example, the display interface 204 may include one or more light projectors (not shown), driven by the left-eye display circuitry 206 and the right-eye display circuity 210, to project light visible to the user 116 such that the user 116 may view the virtual objects within the user's field of view.

The left-eye display element 208 and the right-eye display element 212 may include any type of display elements suitable for presenting a mixed-reality environment to a user 116. In another embodiment, the left-eye display element 208 and the right-eye display element 212 may include a partially-transparent material to allow the user 116 to view real-world objects such as the ball 118 through the near-eye display 102 and simultaneously facilitate the display of virtual objects to the user 116. For example, as illustrated in FIG. 2B, the left-eye display element 208 and the right-eye display element 212 may include a partially-transparent material formed as lenses of mixed-reality glasses 202.

Further, the partially-transparent material may include any type of material. In one embodiment, the left-eye display element 208 and the right-eye display element 212 are formed from a glass material such as, but not limited to, a glass material or a plastic material. In another embodiment, the left-eye display element 208 and the right-eye display element 212 may include one or more coatings. For example, the left-eye display element 208 and the right-eye display element 212 may include anti-reflection and/or anti-glare coatings to provide a comfortable viewing experience. By way of another example, the left-eye display element 208 and the right-eye display element 212 may include a polarization coating to transmit or reflect select polarizations of light. Further, the left-eye display element 208 and the right-eye display element 212 may provide variable transparency through any technique known in the art such as, but not limited to, selective polarization of light. For example, it may be desirable to provide relatively high transparency when a user 116 is required to see and/or interact with physical objects such as the ball 118. By way of another example, it may be desirable to provide relatively low transparency when projecting an opaque virtual scene to the user 116 such as, but not limited to, after the ball 118 has been hit and motion of a virtual ball through a virtual scene is presented to the user 116.

Further, the display interface 204 may display virtual objects using any technique known in the art. In one embodiment, the display interface 204 projects light associated with virtual reality objects onto the left-eye display element 208 and/or the right-eye display element 212 such that the left-eye display element 208 and/or the right-eye display element 212 operate as a screen within the a portion of the field of view. In another embodiment, the display interface 204 projects light associated with virtual reality objects directly onto the retinas of the user 116. In this regard, the left-eye display element 208 and/or the right-eye display element 212 may operate as mirrors that direct light into the eyes of the user 116.

In another embodiment, the near-eye display 102 includes an integrated camera 214 for photometric positional detection driven by a camera interface 216. In another embodiment, the near-eye display 102 includes one or more orientation sensors 218 to determine the head orientation and/or gaze direction in three-dimensional space. For example, the near-eye display 102 may include an inertial measurement unit (IMU) for sensing angular and/or linear rate of change and/or magnetic orientation. By way of another example, the near-eye display 102 includes Global Positioning System (GPS) sensors for satellite detection of position of the near-eye display 102 relative to the earth.

In another embodiment, the near-eye display 102 includes an audio output component 220 and/or a microphone 222 for audio interaction with the user 116. For example, the audio output component 220 may include, but is not limited to, a speaker or fitted earphones to provide audio feedback to the user. The audio feedback may include, but is not limited to, voice narration, commands, instructions, or sound effects. By way of another example, the microphone 222 may allow the user 116 to provide voice commands and/or interact with other users within a virtual environment. The microphone 222 may further monitor external sounds, such as the impact with the ball 118, the landing of the ball 118, breathing patterns of the user 116, or the like.

In another embodiment, the near-eye display 102 includes a communication interface 224 to communicate with additional components of the mixed-reality golf simulator 100 such as the ball-tracking sub-system 104, the user-tracking sub-system 106, or an external controller 110. The communication interface 224 may include circuity (e.g., transmitters, receivers, buffers, amplifiers, filters, or the like) for any type of wired or wireless communication standard known the art such as, but not limited to, WiFi, Bluetooth 4.0 (including Bluetooth Low Energy (BLE)), Bluetooth 5.0, Bluetooth Low Energy (BLE), Zigbee, XBee, ZWave, or a custom standard.

It is recognized herein that various communication bands such as, but not limited to, bands associated with cellular phone communication, WiFi, or Bluetooth may become crowded and/or noisy in public places such as athletic stadiums during a game. In this regard, a communication interface 224 operating on a crowded or noisy communication band may exhibit decreased performance. Further, it may be desirable to provide communication over distances at least as long as a golf course. For example, a user 116 may roam around a field, while the near-eye display 102 communicates to an external controller 110 (e.g., providing at least a portion of processing power required to perform steps described throughout the present disclosure) located at a fixed location. Accordingly, it is contemplated herein that a communication interface 224 of a mixed-reality golf simulator 100 may support a broad range of communication techniques across a wide range of frequency bands and that different communication techniques and/or frequency bands may be selected for different applications and intended uses. In one embodiment, the communication interface 224 includes circuitry for communication using multiple communication bands and/or standards. Further, the communication interface 224 may scan multiple communication bands and select a communication band and/or standard to facilitate a high signal to noise ratio. In another embodiment, the communication interface 224 includes circuitry for spread-spectrum communication techniques such as, but not limited to, frequency-hopping, time-hopping, direct-sequence, or chirp-based spread spectrum techniques. It is recognized herein that spread-spectrum communication may provide various benefits including, but not limited to, resistance to interference from crowded bands and a capacity for long-range communication. For example, the communication interface 224 may provide spread-spectrum communication over public wireless frequencies such as, but not limited to, 900 MHz bands to provide long range (e.g., up to 20 miles) communication.

In another embodiment, the near-eye display 102 includes a user interface 226 to facilitate user interaction. For example, the user interface 226 may include circuitry for providing a series of menus with user-selectable options such that a user 116 may navigate through the menus and adjust the configuration of the mixed-reality golf simulator 100. By way of another example, the user interface 226 may include buttons, sliders, toggle switches, or touch sensors for tactile interaction. The components of the user interface 226 may be located on any user-accessible portion of the near-eye display 102. such as, but not limited to, a frame of mixed-reality glasses 202 (FIG. 2B) or within mixed-reality contact lenses (not shown). For instance, as illustrated in FIG. 2B, the user interface 226 may include one or more buttons 228 or a touch-sensitive slider 230. In this regard, the user 116 may slide a finger along the slider 230 to quickly adjust the display of the mixed-reality scene such as, but not limited to, adjusting a user location on a mixed-reality course to select a specific hole or location on the hole, adjusting the volume of crowd noise, or scrolling through menus. The user 116 may then make selections by pressing the buttons 228, tapping the slider 230, or the like. By way of another example, the user interface 226 includes the microphone 222 to accept audio commands. By way of another example, the user interface 226 includes an eye-tracking camera and associated circuitry suitable for determining the gaze direction of the user 116. Accordingly, a user 116 may interact with the near-eye display 102 through a series of eye-based gestures such as, but not limited to, eye movements to indicate scrolling and long blinks to indicate selection of the last-viewed item. In another embodiment, the user interface 226 may include a communicatively coupled device such as, but not limited to, a mobile phone, a tablet computing device, or a laptop that communicates with the near-eye display 102 via the communication interface 224. In this regard, the user 116 may adjust the mixed-reality environment provided by the near-eye display 102 in a program, an application (e.g., an "app"), through a web-based interface, or the like.

In another embodiment, the near-eye display 102 includes a power interface 232. For example, the power interface 232 may include a battery such as, but not limited to rechargeable lithium ion or nickel-cadmium batteries. By way of another example, the power interface 232 may include battery charging circuity suitable for charging a rechargeable battery. For instance, the power interface 232 may include a receptacle to receive a wired power cord. In another instance, the power interface 232 may include circuitry for wireless battery charging.

In another embodiment, the ball-tracking sub-system 104 is positioned (e.g., by the user 116) to track the ball 118 as it is launched by the user 116. For example, the ball-tracking sub-system 104 may be configured to track the ball 118 over the launch window starting at a selected time prior to impact and ending at a selected time after the shot. In this regard, the user 116 may operate the mixed-reality golf simulator 100 in a location where the travel distance of the ball 118 is limited (e.g., by a containment device including a net, a tether, or the like). Accordingly, the launch window over which the ball-tracking sub-system 104 tracks the ball 118 may end at or before the time at which the motion of the ball 118 is impeded by the containment device.

Figure 3A:
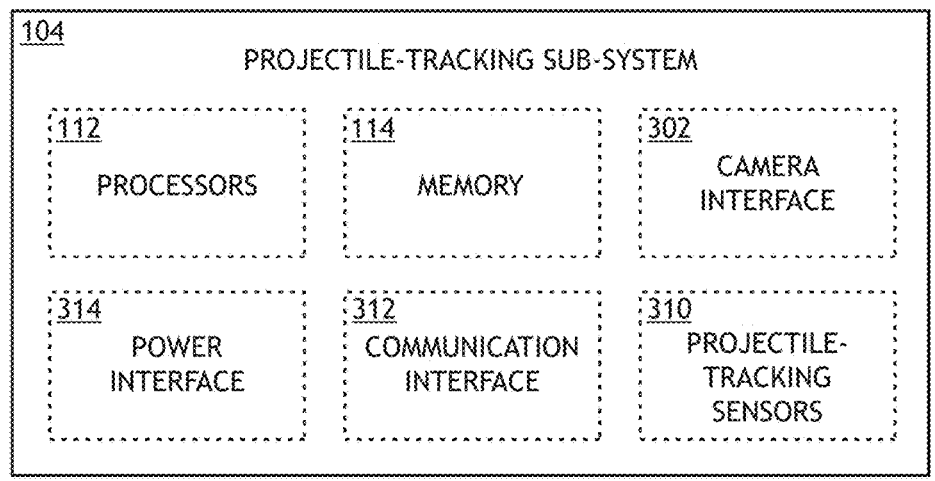
FIG. 3A is a block diagram of components of a ball-tracking sub-system, in accordance with one or more embodiments of the present disclosure.
Figure 3B:
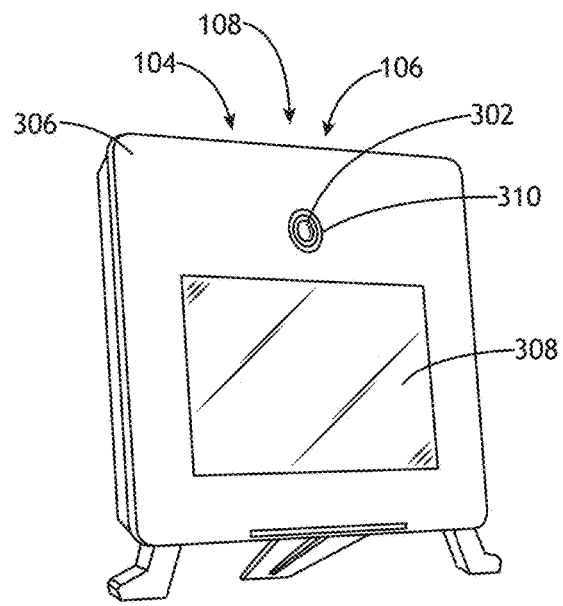
FIG. 3B is a perspective view of a ball-tracking sub-system with a camera configured to be positioned by the user to capture images and/or video of the ball during a swing, in accordance with one or more embodiments of the present disclosure.
Figure 3C:
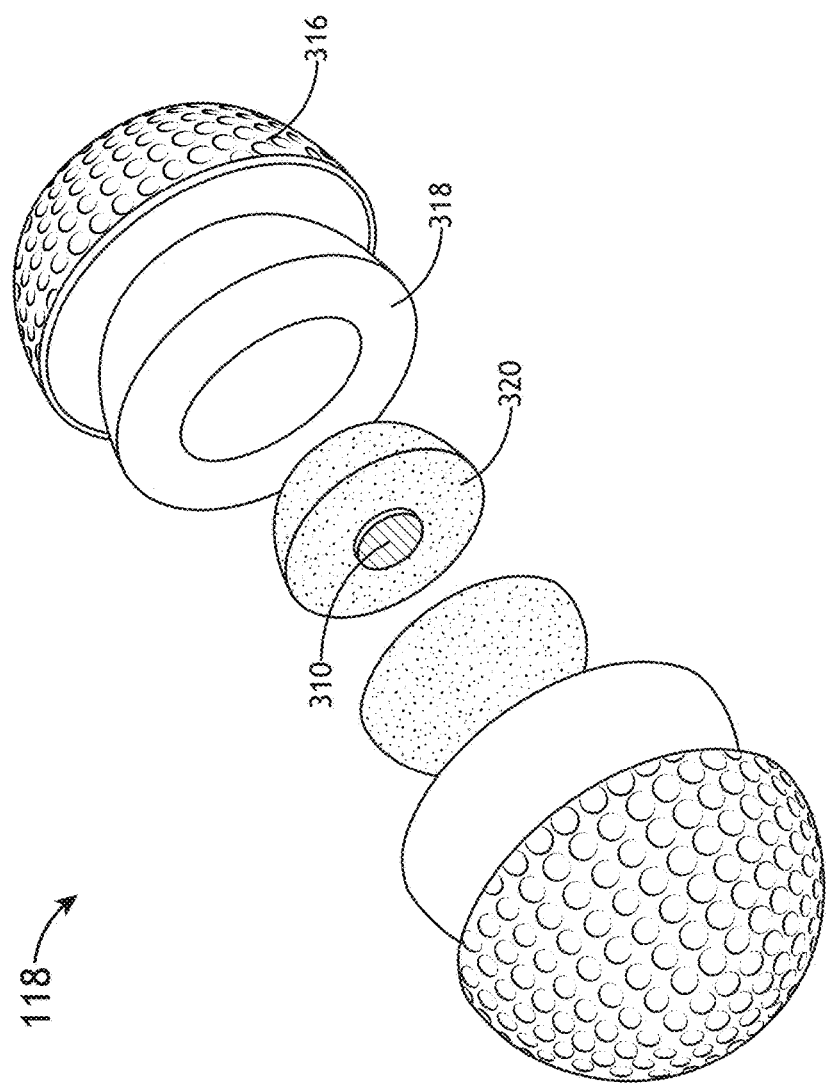
FIG. 3C is an exploded view of ball-tracking sensors integrated within the center of a ball, in accordance with one or more embodiments of the present disclosure.

Referring now to FIGS. 3A through 3C, the ball-tracking sub-system 104 may include any number or type of components known the art suitable for tracking a ball 118 over a selected launch window (e.g., after being hit by the user 116 and ending either when the ball comes to rest or is impeded by a containment device). Further, the components of the ball-tracking sub-system 104 may be configured with any form-factor. In addition, the ball-tracking sub-system 104 may be formed using custom components or may be formed at least in part using off-the-shelf components. For example, commercially available ball-tracking products suitable for integration within the mixed-reality golf simulator 100 may include, but are not limited to, products provided by FlightScope, Trackman, Foresight Sports, or Ernest Sports. FIG. 3A is a block diagram of components of a ball-tracking sub-system 104, in accordance with one or more embodiments of the present disclosure. FIG. 3B is a perspective view of a ball-tracking sub-system 104 with a camera 302 configured to be positioned by the user 116 to capture images and/or video of the ball 118 during a swing (e.g., as illustrated in FIG. 1B), in accordance with one or more embodiments of the present disclosure.

In one embodiment, the controller 110 may be fully or partially integrated into the ball-tracking sub-system 104. In another embodiment, the controller 110 is at least partially distributed to additional components of the mixed-reality golf simulator 100 such as the near-eye display 102 or the user-tracking sub-system 106. For example, it may be the case that the additional system components may have increased processing and/or memory capabilities such that the performance of the mixed-reality golf simulator 100 may be improved by offloading at least a portion of processing steps described throughout the present disclosure. In another embodiment, the controller 110 is at least partially distributed to a mobile computing device such as, but not limited to, a mobile phone or a laptop communicatively coupled to or integrated within the mixed-reality golf simulator 100.

In one embodiment, the ball-tracking sub-system 104 includes camera interface 304 to receive images and/or video of the ball 118 from the camera 302. For example, as illustrated in FIG. 3A, the ball-tracking sub-system 104 may include one or more stand-alone units 306 configured to be placed near the ball 118. In one instance, as illustrated in FIG. 1B, a ball-tracking sub-system 104 may be placed with a camera 302 orthogonal to a plane of motion to generate a side view of the ball 118. In another embodiment, the ball-tracking sub-system 104 may be placed with a camera 302 configured to view the motion of the ball 118 from the perspective of the user 116. For example, the camera 214 of the near-eye display 102 may operate as a ball-tracking sub-system 104. Further, the mixed-reality golf simulator 100 may generally include more than one ball-tracking sub-system 104 to provide more than one camera 302 suitable for viewing various aspects of a swing from multiple angles such as to facilitate accurate tracking of the ball 118. For instance, the camera 302 may capture the movement of a user's body prior to hitting the ball 118, the impact of the club 120 with the ball 118, or the like.

In another embodiment, the ball-tracking sub-system 104 includes a display 308. For example, the display 308 may visualize the images and/or video from the camera 302. Accordingly, the user 116 may utilize the images and/or video to position the ball-tracking sub-system 104 at a suitable location to view the ball 118 during a launch. In one embodiment, the ball-tracking sub-system 104 may store images and/or video captured during a launch such that the user 116 may play back the captured images and/or video to analyze technique. The display 308 may be any type of display known in the art such as, but not limited to, a liquid crystal display (LCD), a light-emitting diode (LED) display, or an organic light-emitting diode (OLED) display. In another embodiment, the display 308 is a touch-sensitive display providing an interactive user interface.

In another embodiment, the ball-tracking sub-system 104 includes one or more additional user interface components such as, but not limited to, buttons, sliders or switches suitable for receiving user input for configuration and/or operation.

In another embodiment, the ball-tracking sub-system 104 includes one or more dedicated ball-tracking sensors 310 to gather data regarding one or more aspects of the motion of the ball 118. The ball-tracking sensors 310 may generally include any type of sensor known in the art. Further, the ball-tracking sensors 310 may generate stand-alone data or may rely on other components such as, but not limited to, the camera 302.

In one embodiment, the ball-tracking sensors 310 include range-finding sensors configured to track the position of the ball 118 over the launch window. For example, the ball-tracking sensors 310 may include a range finder. In this regard, the ball-tracking sensors 310 may emit a signal in the direction of the ball 118, detecting a reflected signal from the ball 118, and determine the distance to the ball 118 by monitoring the time of flight of the signal. For instance, a ball-tracking sensors 310 may include a Radio Detection and Ranging (RADAR) system utilizing radio-frequency pulses for range finding. Accordingly, a RADAR system may include a source of radio-frequency pulses of any selected frequency or range of frequencies, a radio-frequency transmitter to transmit the radio-frequency pulses, and a radio-frequency receiver to detect reflected radio-frequency pulses. In another instance, ball-tracking sensors 310 may include a Light Detection and Ranging (LIDAR) system utilizing light-pulses for range-finding. Accordingly, a LIDAR system may include a light source to generate pulses of light with any selected wavelength or range of wavelengths, one or more lenses to project the light pulses and capture light reflected from the ball 118, and a light detector to detect the captured light pulses. The light source may include any source known in the art such as, but not limited to a laser source. Accordingly, ball-tracking sensors 310 incorporating laser-based range-finding may be characterized as Laser Detection and Ranging (LADAR) systems.

In another embodiment, the ball-tracking sensors 310 include one or more velocity sensors to track the velocity of the ball 118. For example, the ball-tracking sensors 310 may include Doppler sensors to determine velocity of the ball 118 based on shifts in the wavelength (or frequency) of a signal reflected from the ball 118 (e.g., Doppler shifts that are a function of the velocity and direction of motion relative to the sensor). Further, Doppler sensors may utilize pulses of radio waves or light pulses and may be integrated with a range-tracker described above through the addition of a wavelength-sensitive (or frequency-sensitive) detector such as a spectrometer.

In another embodiment, the ball-tracking sensors 310 include weather-monitoring sensors. It is recognized herein that weather conditions such as, but not limited to, air temperature, air pressure, wind speed, and precipitation (fog, rain, snow, sleet, or the like) may impact the trajectory of a ball in flight. Accordingly, the ball-tracking sensors 310 may include weather-monitoring sensors such as, but not limited to air temperature sensors, air pressure sensors, wind speed sensors, or precipitation sensors.

In another embodiment, the ball-tracking sub-system 104 includes a communication interface 312 to communicate with additional components of the mixed-reality golf simulator 100 such as the near-eye display 102, the user-tracking sub-system 106, or an external controller 110. The communication interface 312 may include circuity (e.g., transmitters, receivers, buffers, amplifiers, filters, or the like) for any type of wired or wireless communication standard known the art such as, but not limited to, WiFi, Bluetooth 4.0 (including Bluetooth Low Energy (BLE)), Bluetooth 5.0, Bluetooth Low Energy (BLE), Zigbee, XBee, ZWave, or a custom standard. In a general sense, the communication interface 312 may include any of the same or complementary communication technologies as the communication interface 224 of the near-eye display 102 described previously herein such as, but not limited to, channel-scanning technology or spread-spectrum communication.

In another embodiment, the ball-tracking sub-system 104 includes a power interface 314. For example, the power interface 314 may include a battery such as, but not limited to rechargeable lithium ion or nickel-cadmium batteries. By way of another example, power interface 314 may include battery charging circuity suitable for charging a rechargeable battery. For instance, the power interface 314 may include a receptacle to receive a wired power cord. In another instance, the power interface 314 may include circuitry for wireless battery charging.

In another embodiment, one or more components of the ball-tracking sub-system 104 is integrated on or within the ball 118. For example, the ball 118 may include reflective tape to facilitate the reflection of signals from ground-based ball-tracking sensors 310 (e.g., range-finders, Doppler sensors, or the like). By way of another example, the ball 118 may include one or more ball-tracking sensors 310 to generate data within the ball 118 that may be communicated (e.g., via the communication interface 312) to additional components of the mixed-reality golf simulator 100 such as the near-eye display 102, a stand-alone ball-tracking sub-system 104, an external controller 110, or the like.

The ball-tracking sensors 310 may be placed at any number of locations throughout the ball 118 suitable for providing ball-tracking information (e.g., forces on the ball 118, location, speed, acceleration, rotation, or the like). Further, it is recognized herein that it may be desirable that the ball-tracking sensors 310 have minimal impact on the trajectory of the ball 118 such that the mixed-reality golf simulator 100 may provide accurate simulations of a traditional ball 118. In one embodiment, ball-tracking sensors 310 located within the ball 118 are distributed so as to mitigate any impact on the center of mass of the ball 118.

FIG. 3C is an exploded view of ball-tracking sensors 310 integrated within the center of a ball 118, in accordance with one or more embodiments of the present disclosure. For example, a ball 118 may be formed from an outer layer 316, zero or more outer cores 318, and an inner core 320 (e.g., a boundary layer, an outer core, an inner core, or the like). In one embodiment, one or more ball-tracking sensors 310 may be located within the inner core 320. For example, ball-tracking sensors 310 may be located at the center of a ball 118 and may be designed such that the ball 118 has a symmetric weight distribution. In this regard, a ball 118 including ball-tracking sensors 310 may have impact and trajectory characteristics similar to or the same as a traditional ball 118. In some cases, a ball 118 including ball-tracking sensors 310 may be indistinguishable from a traditional ball 118 during play.

It is to be understood, however, that FIG. 3C and the associated description are provided solely for illustrative purposes and should not be interpreted as limiting. For example, the ball-tracking sensors 310 may be placed at any number of selected locations throughout the ball 118 to facilitate the collection of ball-tracking data. For instance, ball-tracking sensors 310 may be distributed around an inner portion of the outer layer 316.

In one embodiment, the ball-tracking sensors 310 include, but are not limited to, an inertial measurement unit (IMU) including any combination of accelerometers, orientation sensors, electromagnetic sensors, or magnetometers to measure and generate data associated with the acceleration, orientation, and/or rotation of the ball 118. By way of another example, the ball-tracking sensors 310 may include an altimeter to determine the height of the ball 118 with respect to the ground. By way of another example, the ball-tracking sensors 310 may include a global positioning system (GPS) device configured to determine the position of the ball 118 in three-dimensional coordinates.

In another embodiment, the system includes a user-tracking sub-system 106 including one or more sensors to monitor the motion of the user 116 during a shot. It is recognized herein that the motion of the user including the body position and body movement critically impact the mechanics of the action and thus the resulting trajectory of the ball 118. Accordingly, the user-tracking sub-system 106 may monitor and generate user motion data associated with one or more aspects of the body of the user 116 before, during, or after a swing. This user motion data during a launch may then be correlated with the trajectory of the ball 118 to provide a comprehensive tracking dataset associated with each user action.

The user-tracking sub-system 106 may be provided as one or more stand-alone devices (e.g., stand-alone device 306, or the like) or may be at least partially integrated with other system components such as the ball-tracking sub-system 104 or the near-eye display 102. For example, as illustrated in FIG. 1B, the user-tracking sub-system 106 may include the camera 302 described previously herein associated with the ball-tracking sub-system 104. In this regard, the user-tracking sub-system 106 may track the motion of the user and generate data such as, but not limited to, positions of one or more body parts (e.g., arms, legs, feet, hips, shoulders, head, or the like), trajectories of the body parts, or motion data associated with the body parts (e.g., speed, acceleration, or the like). By way of another example, the user-tracking sub-system 106 may include one or more wearable sensors worn by the user 116. For instance, the user-tracking sub-system 106 may include the near-eye display 102 to generate positional information of the user 116 during a swing. In another instance, the user-tracking sub-system 106 may include one or more sensor pads (not shown) embedded within shoes worn by the user 116 (e.g., shoes 124 in FIG. 1B). The sensor pads may include any type of sensor suitable for tracking user motion such as, but not limited to, a pressure sensor, an inertial measurement unit (IMU), a pedometer, or the like. In this regard, the user-tracking sub-system 106 may track user data such as, but not limited to, a number of steps, shifts in weight during a swing, arm speed, arm trajectory, or the like. In another instance, the user-tracking sub-system 106 may include wearable sensors to be distributed across the body of the user 116. In this regard, the user-tracking sub-system 106 may gather user movement data of various parts of the body such as, but not limited to, hip movement, shoulder movement, arm movement, elbow angle, head position, or body posture during a swing.

The club-tracking sub-system 108 may be provided as one or more stand-alone devices (e.g., stand-alone device 306, or the like) or may be at least partially integrated with other system components such as the ball-tracking sub-system 104, the near-eye display 102, the user-tracking sub-system 106, or the like. For example, the club-tracking sub-system 108 may include the camera 302 described previously herein associated with the ball-tracking sub-system 104 and/or the user-tracking sub-system 106. In this regard, the club-tracking sub-system 108 may track the motion of the club 120 and generate data such as, but not limited to, position, speed, trajectory, or face angle of the club 120. By way of another example, the club-tracking sub-system 108 may include one or more sensors integrated or attached to the club 120 (e.g., in the face, the shaft, the grip, or the like). For instance, the club-tracking sub-system 108 may include, but is not limited to, an inertial measurement unit (IMU) attached to the equipment.

In another embodiment, the controller 110 receives tracking data from the ball-tracking sub-system 104 over the launch window and determines a predicted trajectory of the ball 118 after the launch window. The controller 110 may determine the predicted trajectory of the ball 118 using any technique known in the art. For example, the controller 110 may include a physics engine suitable for generating a predicted trajectory based in input data from the ball-tracking sub-system 104 (including ball data and weather data) the user-tracking sub-system 106, and/or the club-tracking sub-system 108 as initial conditions. Further, the controller 110 may utilize a virtual environment selected by the user 116 or measurements of the physical environment to determine the landing position of the ball 118.

In one embodiment, the mixed-reality golf simulator 100 may save (e.g., in the memory medium 114) tracking data from the user-tracking sub-system 106 and/or the ball-tracking sub-system 104 for each action or for any user-selected actions. Further, the tracking data may be analyzed by the user 116 and/or by the controller 110 to correlate user motion data from the user-tracking sub-system 106 with ball-tracking data from the ball-tracking sub-system 104 and/or predicted trajectory data from the controller 110.

Further, the mixed-reality golf simulator 100 may present the tracking data to the user 116 as mixed-reality objects through the near-eye display 102. FIG. 4 is a perspective view of an avatar 402 representing a user 116 during a swing, in accordance with one or more embodiments of the present disclosure. In one embodiment, the near-eye display 102 may display an avatar 402 performing the motion of the user 116 and the club 120 during a swing as well as the predicted trajectory of a virtual ball 404 after impact as virtual objects. Further, the near-eye display 102 may display relevant tracking data (e.g., launch angle, launch velocity, rotation, impact point on the ball, swing speed, or the like). In this regard, the user 116 may move around the avatar and view the motions and relevant data associated from multiple viewpoints.

In another embodiment, the mixed-reality golf simulator 100 may learn the natural motions and techniques of the user 116 over time through continued use of the mixed-reality golf simulator 100 and may correlate the impact of specific body movements to the resulting trajectory of the ball 118. Accordingly, the mixed-reality golf simulator 100 may identify specific aspects of user motion that substantially impact the outcome and provide user-customized coaching data to assist the user in modifying his or her technique. For example, the near-eye display 102 may sequentially or simultaneously display avatars 402 illustrating past actions with different outcomes to provide a side-by-side comparison of the user motion and corresponding trajectories. By way of another example, the near-eye display 102 may display an avatar 402 of the user going through a suggested motion as a guide.

Referring now to FIGS. 5 through 8B, the operation of the mixed-reality golf simulator 100 by the user 116 is described in accordance with one or more embodiments of the present disclosure.

Figure 5:
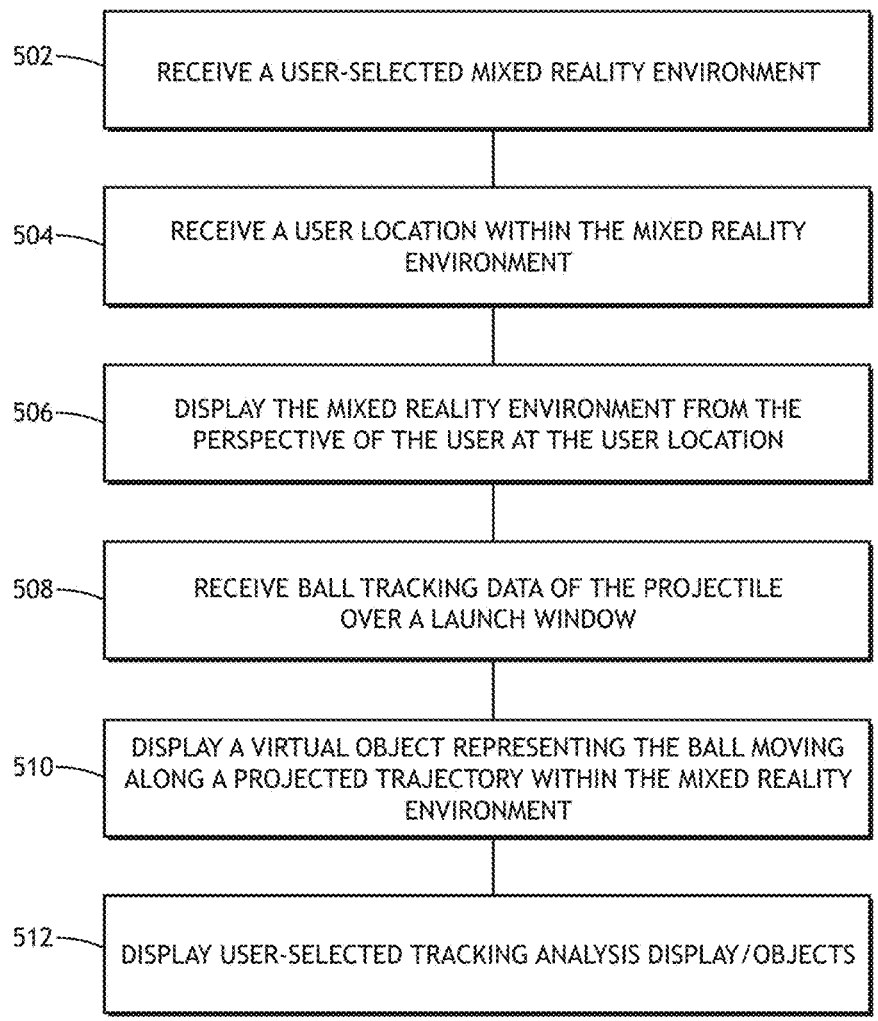
FIG. 5 is a flow diagram illustrating steps performed in a method for mixed-reality golf simulation, in accordance with one or more embodiments of the present disclosure.

FIG. 5 is a flow diagram illustrating steps performed in a method 500 for mixed-reality golf simulation, in accordance with one or more embodiments of the present disclosure. Applicant notes that the embodiments and enabling technologies described previously herein in the context of mixed-reality golf simulator 100 should be interpreted to extend to method 500. It is further noted, however, that the method 500 is not limited to the architecture of the mixed-reality golf simulator 100.

In one embodiment, the method 500 includes a step 502 of receiving a user-selected mixed-reality environment. For example, as described previously herein, a user 116 may select any desired combination of virtual elements forming a virtual environment to be displayed on the near-eye display 102.

For example, a user 116 may select any combination of virtual objects to be displayed along with physical objects visible through the near-eye display 102. In this regard, the mixed-reality environment may include augmented reality objects. By way of another example, the user 116 may select a combination of opaque virtual objects that may represent an immersive virtual scene that occupies at least a portion of the field of view of the user and completely blocks physical objects from view. Further, virtual objects in the virtual environment may be displayed based on the head orientation and/or the gaze direction of the user 116. For example, the user 116 may turn his or her head in any orientation (e.g., up, down, in any horizontal direction) and may view the mixed-reality environment including physical and virtual objects from the associated orientation. In this regard, the mixed-reality environment may provide an immersive experience.

In one embodiment, the virtual environment includes virtual objects representing a selected location such as, but not limited to, an open field, a driving range, one or more features of a virtual course (e.g., augmented-reality objects of a green, a fairway, rough, traps, a pin, or the like), a virtual reality scene of a golf course, or user guides (e.g., distance to the pin, distances to traps, distances to suggested target locations to place the ball, or the like).

In another embodiment, the method 500 includes a step 504 of receiving a user location within the mixed-reality environment. In another embodiment, the method 500 includes a step 506 of displaying the mixed-reality environment from the perspective of the user at the user location.

Figure 6A:
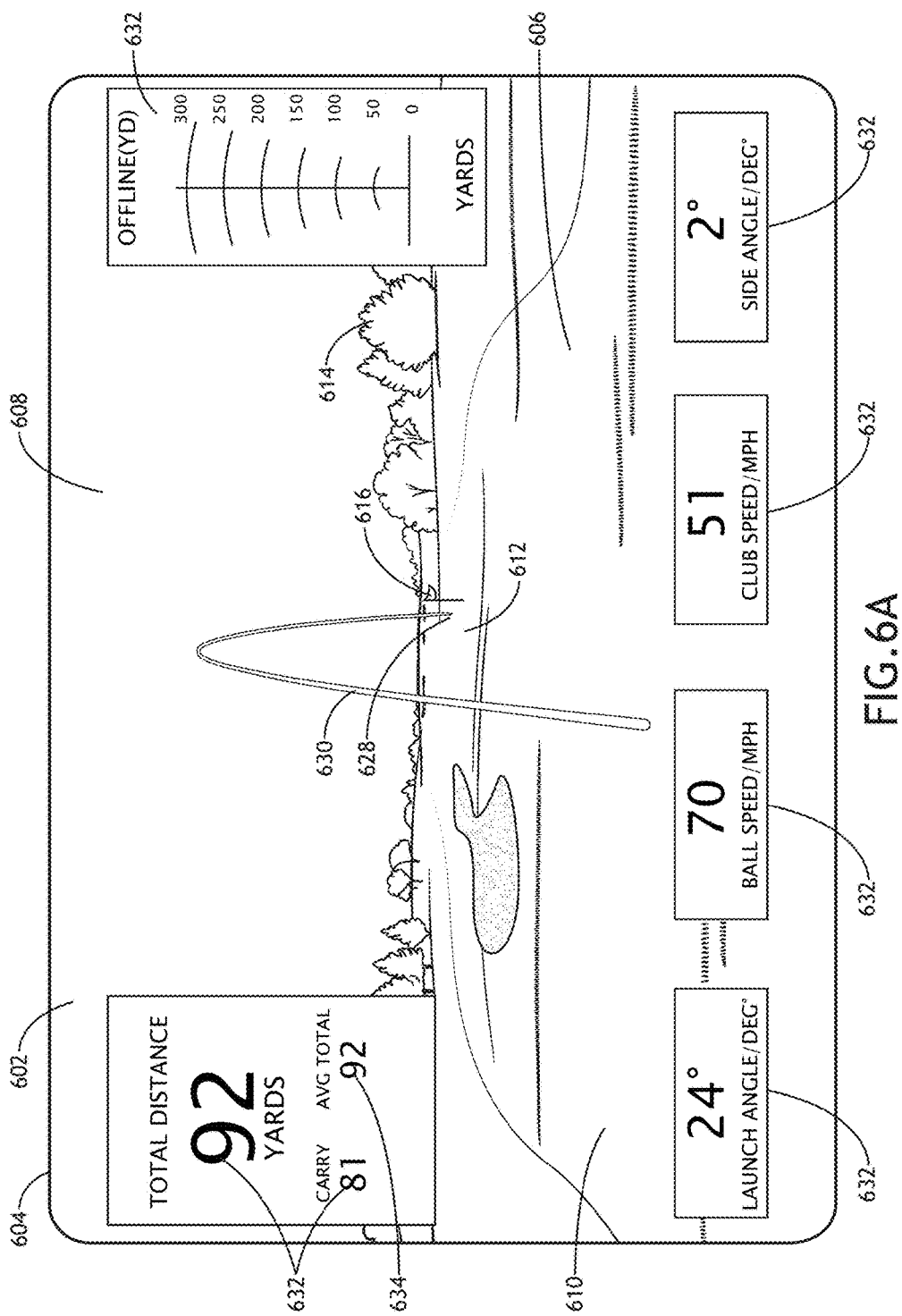
FIG. 6A is a conceptual view of a mixed-reality environment including a golf course from a field of view of a user when looking in a horizontal direction, in accordance with one or more embodiments of the present disclosure.

FIG. 6A is a conceptual view of a mixed-reality environment 602 including a golf course from a field of view 604 of a user when looking in a horizontal direction, in accordance with one or more embodiments of the present disclosure. In one embodiment, the mixed-reality environment 602 includes a combination of physical (e.g., real-world) objects and virtual objects associated with the course. For example, the mixed-reality environment 602 may include a combination of real and virtual objects such as, but not limited to, grass 606, the sky 608, a fairway 610, a green 612, trees 614, or the pin 616. For instance, a user on a driving range may view the grass 606, the trees 614, and the sky 608 as real-world objects directly through the near-eye display 102 and may view the fairway 610, the green 612, and the pin 616 as virtual objects (e.g., augmented-reality objects). In another instance, a user may display a virtual reality scene in which the entire environment (e.g., the grass 606, the trees 614, the sky 608, the fairway 610, the green 612, and the pin 616) are virtual objects. In another instance, a user may display a real-world view of a golf course in which the entire environment (e.g., the grass 606, the trees 614, the sky 608, the fairway 610, the green 612, and the pin 616) are real-world objects.

In another embodiment, the mixed-reality golf simulator 100 may monitor and map physical objects such that the virtual objects may be displayed in a coordinate system that matches the physical locations of the physical objects in the real-world view of the user 116. Accordingly, the mixed-reality golf simulator 100 (e.g., via the near-eye display 102) may detect the presence of physical objects and may display virtual objects of missing physical objects according to the perspective and location of the user in both the real world and the virtual environment. Taking a non-limiting example of a the golf course illustrated in FIG. 6A in which grass 606, the trees 614, and the sky 608 are real-world objects, the mixed-reality golf simulator 100 may detect and map the locations of the real objects and display virtual objects corresponding to fairway 610, the green 612, and the pin 616 based on the locations of the real-world objects. In this regard, the real-world objects and the virtual objects may appear to exist in the same space.

The mixed-reality golf simulator 100 may detect and map the locations of physical objects using any technique known in the art. In one embodiment, the mixed-reality golf simulator 100 detects the locations of physical objects using any combination of components of the mixed-reality golf simulator 100 such as, but not limited to, the camera 214 on the near-eye display 102, the camera 214 on a ball-tracking sub-system 104, or any combination of sensors (e.g., range-finding sensors, or the like) located in the near-eye display 102, the ball-tracking sub-system 104, or as stand-alone devices. For example, in the case that a user (e.g., user 116) is on a real-world golf course, virtual objects such as, but not limited to, step 504 may include determining the location of the user on the field (e.g., using a GPS sensor on the user), receiving the location from an external GPS device (e.g., a mobile phone, a dedicated GPS device, or the like), or by a context-based analysis of the surroundings (e.g., received by the near-eye display 102, or the like). Accordingly, step 506 may include displaying user guides may be displayed based on the location of the user. By way of another example, in the case that the user is in a fixed location (e.g., a driving range, near a containment device, or the like), step 504 may include determining a user location based on previous actions. For instance, step 504 may include determining the user location based on a landing location of a ball from a previous shot in a virtual course.

In another embodiment, step 504 includes receiving the user location via user input (e.g., via the user interface 226 of the near-eye display 102, or the like). In this regard, a user may select any desired location (e.g., a particular hole of a particular virtual golf course, or the like).

In another embodiment, the mixed-reality golf simulator 100 accepts or prompts for user-assisted locating of physical objects. For instance, the user 116 may engage the user interface 226 while standing at selected boundaries (e.g., tee boxes, or the like). The mixed-reality golf simulator 100 may then generate a virtual coordinate system that corresponds to the physical world such that virtual objects may be properly located alongside real-world objects in a mixed-reality environment.

In another embodiment, data associated with a real-world golf course displays saved images of a scene (e.g., images of a real-world golf course) based on a detected location of the user. For instance, panoramic images may be generated at regular intervals around a course at known locations (e.g., at known GPS coordinates, or the like). In one embodiment, high-resolution 360 degree images (e.g., 4k images, 8k images, or the like) may be captured that show every angle available to a user at each location. Further, the images may be taken at any selected interval such as, but not limited to, every foot, every 3 feet, or the like in a grid pattern. Accordingly, step 506 may include displaying orientation-dependent images of a real-world golf course at a selected location.

By way of one example, the mixed-reality golf simulator 100 may identify (e.g., with the camera 214, or the like) the surroundings and display virtual objects based on the surroundings. For example, the mixed-reality golf simulator 100 may identify that the user is on a driving range or a closed room and may display virtual objects representing selected objects (e.g., fairway 610, the green 612, the pin 616, or the like). Further, the size and orientation of the virtual objects may be continually adjusted as the user 116 moves around the virtual environment, looks in different directions, or the like based on data provided by the near-eye display 102.

In another embodiment, a virtual environment may be bounded to a selected set of view vectors (e.g., gaze directions, or the like) that represent lines of sight within a field of view of the user. For example, it may be desirable for the user to accurately view the ball 118 in order to properly execute a swing. Accordingly, the near-eye display 102 may be configured to provide at least a partially unobstructed view of the real world when the user is looking down or at the ball 118 and display all selected virtual objects of the virtual environment as the user looks upward (e.g., to aim within a mixed-reality environment and/or as the user follows through after a shot). In this regard, the near-eye display 102 may determine a set of view vectors for a given field of view of the user and selectively display virtual objects (e.g., associated with the virtual environment and/or ball-trajectory data) only for view vectors above a selected angle. For instance, the selected angle may be, but is not required to be, defined as a selected pitch angle of the head of the user with respect to the horizon.

In another embodiment, a virtual environment, or portions thereof, may be selectively displayed based on whether or not a ball 118 has been hit. For example, the near-eye display 102 may provide at least a partially unobstructed view of the real-world prior to a hit and display all selected virtual objects (e.g., associated with the virtual environment, ball-tracking data, user-tracking data, and/or club-tracking data) after a hit.

Figure 6B:
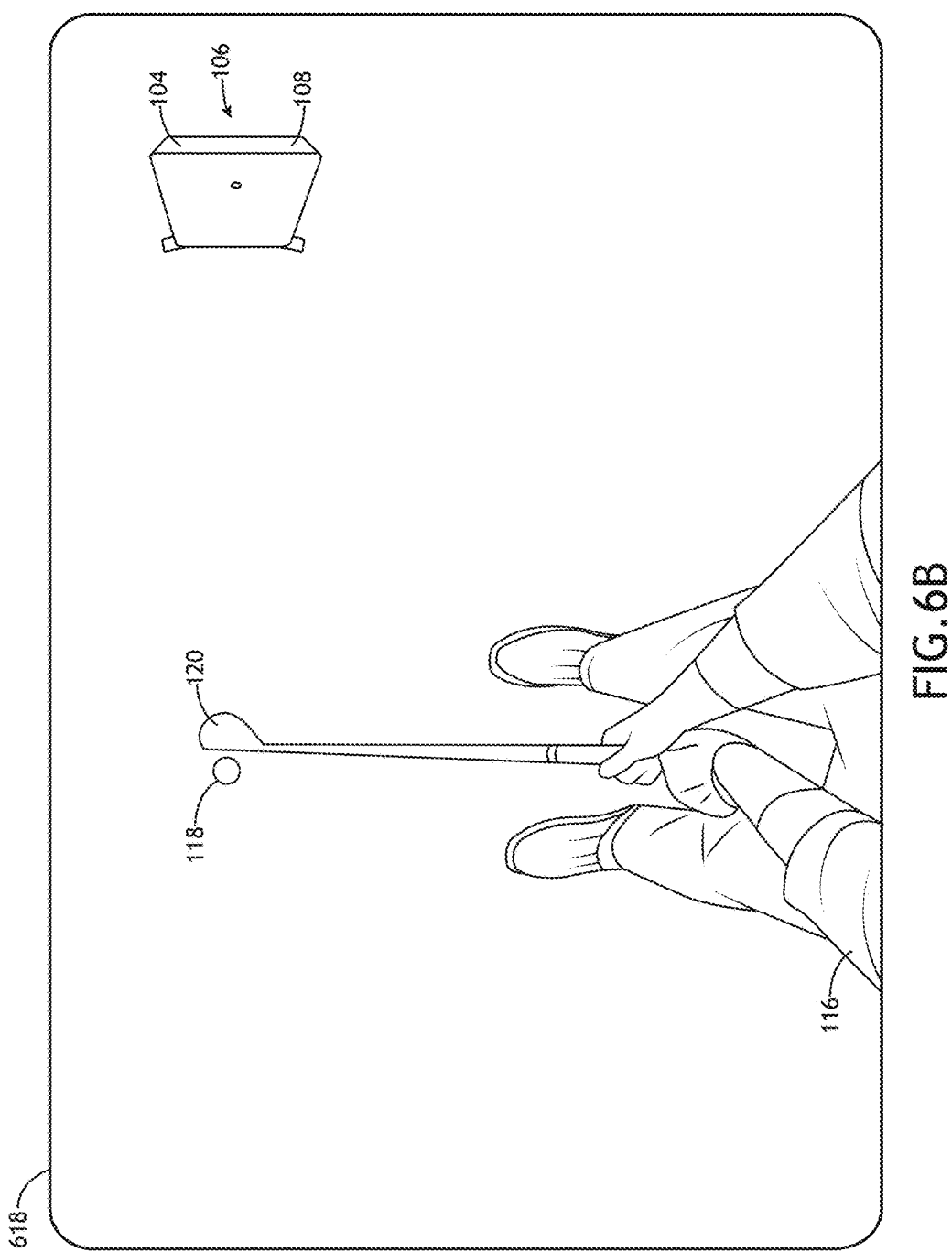
FIG. 6B is an unobstructed field of view of a user when looking in a downward direction, in accordance with one or more embodiments of the present disclosure.

FIG. 6B is an unobstructed field of view 618 of a user 116 when looking in a downward direction (e.g., below a selected pitch angle), in accordance with one or more embodiments of the present disclosure. For example, the user may see the ball 118, the club 120, and a portion of the body of the user 116 (e.g., feet, legs, hands, or the like) as real objects through the near-eye display. In one embodiment, as illustrated in FIG. 6B, the field of view of the user (e.g., the field of view 618 of FIG. 6B) may be completely unobstructed and thus free of any virtual objects at a selected time (e.g., when looking downward and/or prior to a hit). In another embodiment, though not shown, the field of view of the user may include selected virtual objects (e.g., user guides, or the like) that may facilitate preparation for or execution of a shot.

Figure 6C:
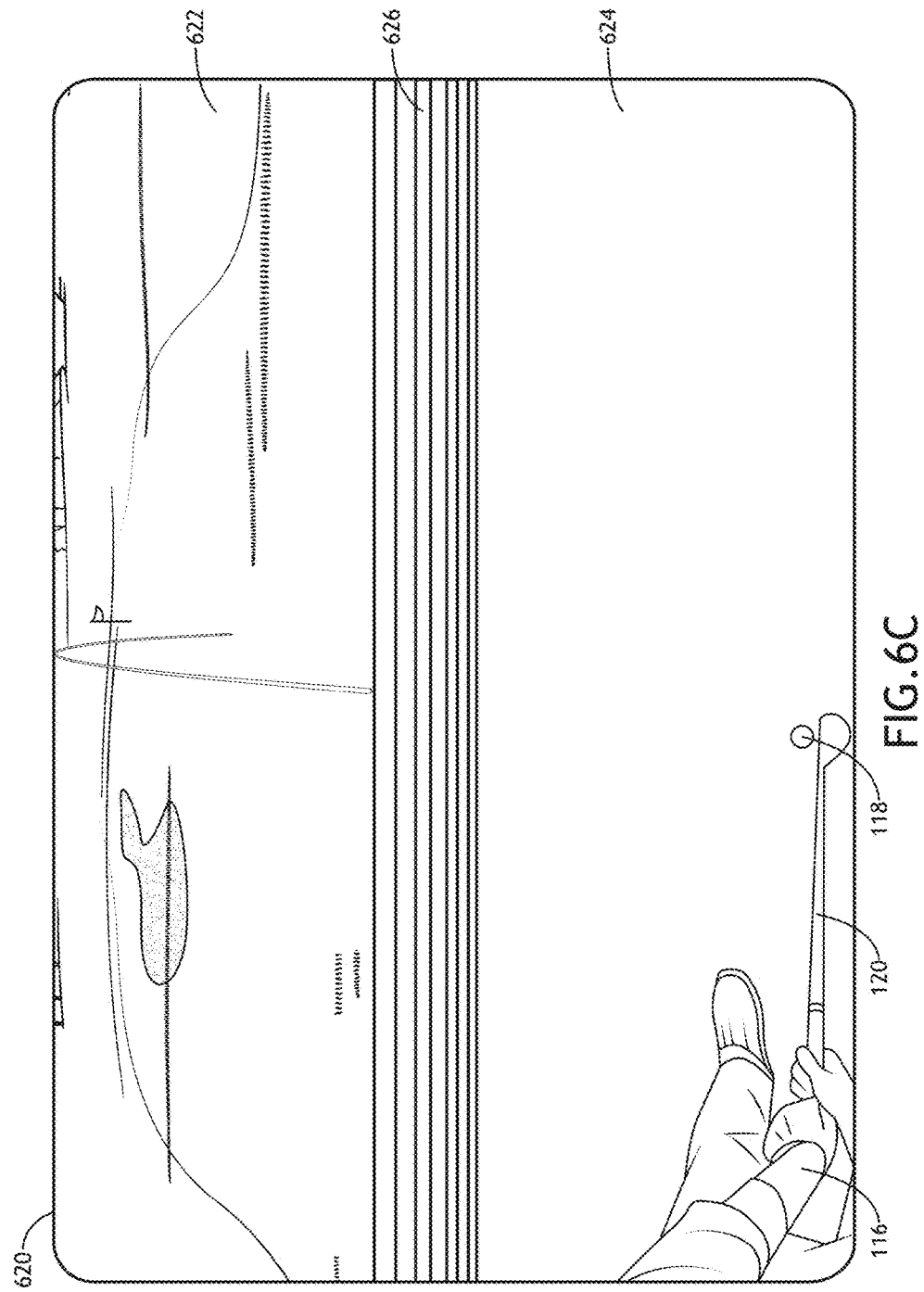
FIG. 6C is a field of view of a user transitioning between a virtual environment of FIG. 6A and an unobstructed view of FIG. 6B, in accordance with one or more embodiments of the present disclosure.

Further, the near-eye display 102 may provide smooth transitions between different views (e.g., the views of FIG. 6A and FIG. 6B) to provide a seamless experience as the user 116 adjusts a gaze direction. FIG. 6C is a field of view 620 of a user transitioning between a virtual environment of FIG. 6A and an unobstructed view of FIG. 6B, in accordance with one or more embodiments of the present disclosure. In this regard, the user 116 may iteratively look down at the ball 118 and up to view the mixed-reality environment 602 including a mixed-reality combination of real or virtual objects such as, but not limited to, the grass 606, the trees 614, the sky 608, the fairway 610, the green 612, and the pin 616.

For example, the field of view 620 may be defined by a set of view vectors associated with lines of sight of the user. The near-eye display 102 may then be configured to display virtual objects only for a first portion 622 of the field of view 620 (e.g., a first selected set of lines of sight) and an unobstructed real-world view for a second portion 624 of the field of view 620 (e.g., a second selected set of lines of sight). The transition 626 between the first portion 622 and the second portion 624 of the field of view 620 may be determined by any selected condition. For instance, as illustrated in FIG. 6C, the transition 626 may be, but is not required to be, determined based on a selected angle (e.g., a pitch angle) associated with a head orientation with respect to the horizon. Further, it is to be understood that the transition 626 may be graphically displayed using any technique known in the art such as, but not limited to, a sharp transition line, a blurred transition line, or a progression of interleaved shapes (e.g., lines as illustrated in FIG. 6C).

In another embodiment, the mixed-reality golf simulator 100 may provide unobstructed views for selected physical objects regardless of the head orientation of the user. For example, it may be desirable for a user 116 preparing to hit a ball 118 to see an unobstructed view of the pin 616 (e.g., a real pin on a physical course) regardless of head orientation. By way of another example, it may be desirable for a user 116 to always see an unobstructed view of selected real objects such as, but not limited to, people (e.g., other players, course staff, or the like), golf carts, or animals regardless of head orientation. In one embodiment, a selected set of lines of sight (e.g., a cone of reality) including the selected physical objects is always visible to the user 116 as an unobstructed real-world view. Accordingly, as the user turns his or her head, the cone of reality including lines of sight towards the selected lines of sight are free of virtual objects. Further, the selected physical objects may be identified using any method known in the art. For example, the selected physical objects may be identified based on imaged and/or video from a camera on a near-eye display (e.g., camera 214 of the near-eye display 102, or the like) using any combination of object identification and/or machine learning techniques.

Figure 7:
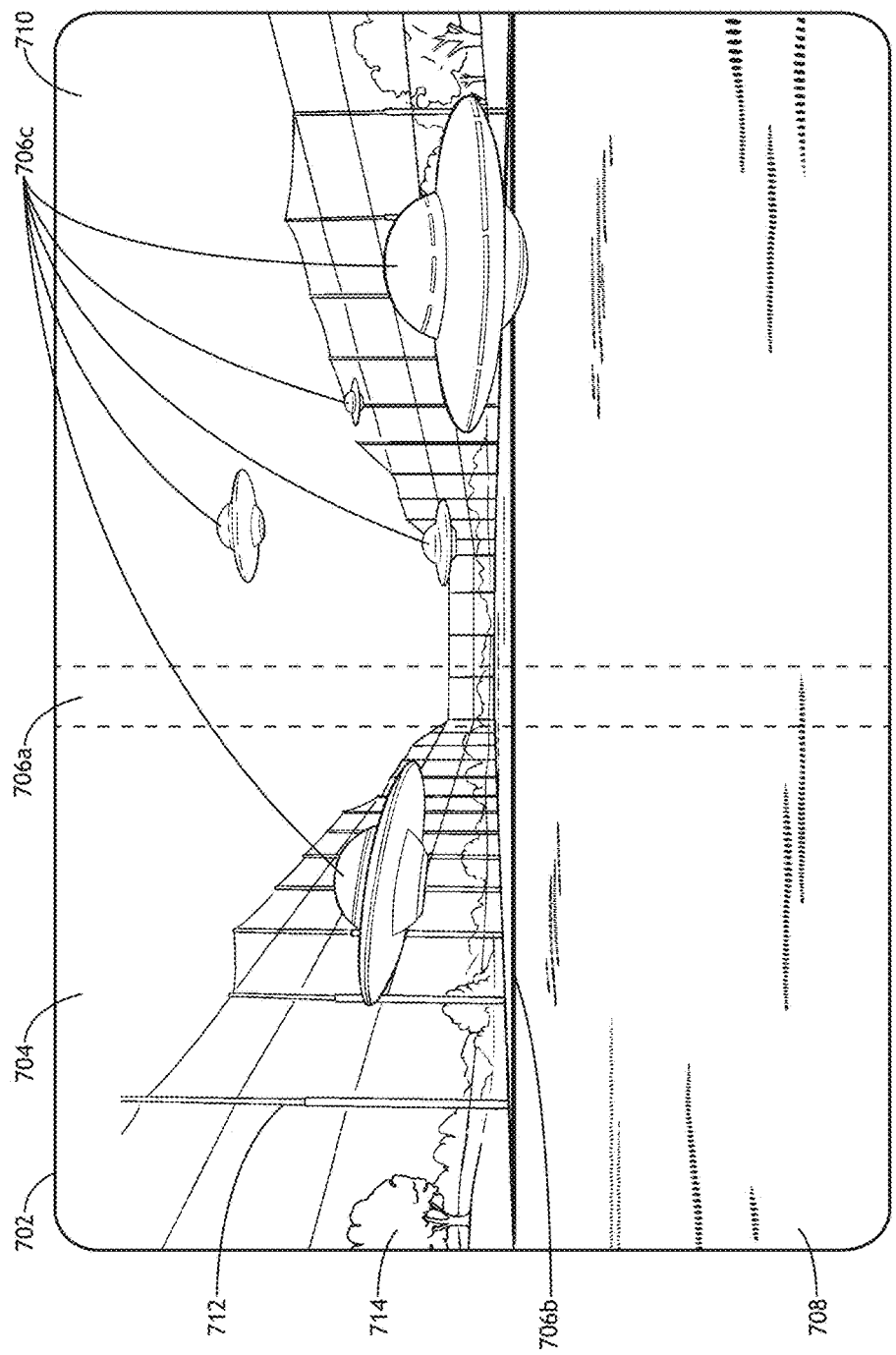
FIG. 7 is a field of view of a mixed reality environment including targets provided to a user, in accordance with one or more embodiments of the present disclosure.

In another embodiment, the virtual environment may include one or more suggested targets at which the user should aim. FIG. 7 is a field of view 702 of a mixed reality environment 704 including targets 706 provided to a user, in accordance with one or more embodiments of the present disclosure. The mixed reality environment 704 may include any combination of real and/or virtual objects including, but not limited to, grass 708, sky 710, netting 712 (e.g., driving range netting, or the like), or trees 714. For example, a user on a driving range may view the grass 708, sky 710, netting 712, and trees 714 as real objects and the targets 706 as virtual objects. By way of another example, a user in a closed practice space may view all of the grass 708, sky 710, netting 712, trees 714, and targets 706 as virtual objects.

The targets 706 may include any combination of stationary or moving targets at selected heights and/or distances from the user. Further, the suggested targets may include any type of virtual objects visible to the user. In one embodiment, the targets 706 include a range of target directions 706a to hit a ball (e.g., a narrow range of launch directions suitable for aiming practice, or the like). In another embodiment, the targets 706 include indicators 706b of a target distance (e.g., virtual lines associated with a target carry distances that the user should attempt). In another embodiment, the targets 706 include virtual target objects 706c (e.g., spacecraft as illustrated in FIG. 7) located at selected distances and/or heights. Further, target objects may be stationary at fixed distances with respect to the user or may be moving with respect to the user in the virtual environment. It is to be understood, however, that virtual target objects 706c may include any selected virtual objects such as, but not limited to, bulls-eye targets, airplanes, animals, two-dimensional shapes, or three-dimensional objects. By way of another example, the near-eye display may display a success indicator 716 showing whether a hit was successful by any selected metric (e.g., whether a trajectory of a shot was within a target range 706a, beyond a target distance 706b, or hit a virtual target object 706c, or the like). Further, the success indicator 716 may display a running total of goals reached, points scored, or the like for the user and/or for additional users (e.g., in a multiplayer environment).

The user may select the virtual reality environment through any type of user interface. For example, the near-eye display 102 may provide a series of menus and display choices to the user 116. Further, the user 116 may interact with the near-eye display 102 with the user interface 226. In one embodiment, as described previously herein, the near-eye display 102 may include an eye-tracking system. In the regard, the user may scroll through various configuration menus using eye movements and may make selections using eye gestures such as, but not limited to, one or more short blinks, one or more long blinks, or eye rolls. In another embodiment, the near-eye display 102 may include one or more buttons or sliders to facilitate user input. For instance, a user may select a location within the virtual environment (e.g., a location within a virtual course) by simply sliding a finger along a slider device.

In another embodiment, the method 500 includes a step 508 of receiving tracking data of the ball 118 over a launch window after a hit. For example, the controller 110 may receive tracking data of the ball 118 from the ball-tracking sub-system 104.

In another embodiment, the method 500 includes a step 510 of displaying a virtual object representing the ball 118 moving along a trajectory within the mixed-reality environment. For example, referring again to FIG. 6A, a ball 628 may be shown to move along a trajectory 630. Further, the ball 628 and/or the trajectory 630 may be real or virtual. For instance, in the case of a user hitting a ball on an open field (e.g., a course, a range, or the like), the ball 628 may include the real ball visible through the near-eye display. Further, the trajectory 630 may include a complete trajectory obtained by the ball-tracking sub-system 104 or a combination of a partial trajectory obtained by the ball-tracking sub-system 104 over a launch window (e.g., a range of operation of the ball-tracking sub-system 104, a selected range, or the like) combined with a predicted trajectory based on the partial trajectory. In another instance, in the case of a user hitting a ball into a containment device, the ball 628 may include a virtual ball travelling along a predicted trajectory based upon the partial trajectory ending when the ball motion is hindered by the containment device.

In another embodiment, the ball 628 may be displayed as any type of virtual object. In one embodiment, the ball 628 replicates a view of a physical ball. In another embodiment, the ball 628 further includes one or more virtual objects (e.g., overlaid colors, a "glow," or the like) to improve the visibility of the ball 628.

The trajectory 630 may be displayed in any user-selectable manner. For example, the entire trajectory 630 may be displayed as illustrated in FIG. 6A. By way of another example, a portion of the trajectory 630 may be displayed as a "tail" of a selected length behind the ball 628.

A predicted trajectory (e.g., a trajectory of a ball outside of a launch window monitored by the ball-tracking sub-system 104) may be calculated by any technique known in the art. For example, the predicted trajectory may be calculated by the controller 110 based on data from the ball-tracking sub-system 104 and/or the user-tracking sub-system 106 generated during the launch window as described previously herein. For instance, the controller 110 may determine a partial trajectory of the ball 118 over the launch window and utilize this partial trajectory along with the additional ball data at the end of the launch window such as, but not limited to velocity and rotation to determine the predicted trajectory.

In another embodiment, the controller 110 determines the predicted trajectory based on weather conditions such as, but not limited to, wind speed, air pressure, or temperature. For example, weather conditions may correspond to real-world weather conditions at the current location of the user 116. In one instance, weather conditions may be gathered by one or more weather sensors integrated within the mixed-reality golf simulator 100 (e.g., within the near-eye display 102, the ball-tracking sub-system 104, the user-tracking sub-system 106, or as stand-alone sensors). In another instance, weather conditions are received from a remote server (e.g., a weather website, or the like). By way of another example, weather conditions may be selected by the user 116 to provide for simulation and/or training in a selected environment. Similarly, the weather conditions may be manually selected (e.g., via the user interface 226) or may be received from a remote server providing weather data for a selected remote location (e.g., a field at which an upcoming game is to be played).

In another embodiment, the method 500 includes a step 512 of displaying user-selected data as virtual objects. As described previously herein, the mixed-reality golf simulator 100 may monitor and track a wide range of metrics associated with hitting a ball such as, but not limited to, ball-tracking data (e.g., from the ball-tracking sub-system 104), user-tracking data (e.g., from the user-tracking sub-system 106), and/or club-tracking data (e.g., from the club-tracking sub-system 108) and present associated data to the user as feedback. Further, the data may be associated with a current swing, a previous swing, historical data associated with many previous swings, or the like. Additionally, the data may be linked to various clubs such that the user may track differences between shots made with different clubs.

For example, as illustrated in FIG. 6A, the near-eye display 102 may display current tracking data 632 as virtual objects to the user. By way of another example, the near-eye display 102 may display historical data 634 associated with previous shots such as, but not limited to, average values of ball-tracking metrics (e.g., carry distance, total distance, loft height, launch angle, hook angle, or the like). By way of another example, the near-eye display 102 may display the club type. In this regard, the historical data may be, but is not required to be, referenced to the club type shown.

In one instance, as illustrated in FIG. 6A, the near-eye display 102 may display at least a portion of the virtual data as head-locked data that remains in a fixed position regardless of the orientation of the user 116. In another instance, the near-eye display 102 may display the current tracking data 632 as spatially anchored data at a fixed location within the virtual environment. For instance, though not shown, ball-tracking data may be presented on a virtual board located on or near the field such that the data may be visible when the user looks in the direction of the virtual board.

Further, as described previously herein, the near-eye display 102 may display the current tracking data 632 only at selected times (e.g., after a launch) or selected orientations (e.g., for view vectors above a selected angle, or the like).

The mixed-reality golf simulator 100 may support any number of user modes that may include predefined settings configured to provide a selected user experience. Further, the user modes may be generated, modified, and/or saved by the user 116. Additionally, multiple modes may operate simultaneously. It is thus to be understood that the descriptions of the modes herein are provided solely for illustrative purposes and should not be interpreted as limiting.

In some embodiments, a mixed-reality golf simulator includes a virtual range mode. For example, the virtual range mode may provide a mixed reality environment for a user to make multiple shots and to display trajectory and/or tracking data associated with the shots. In this regard, the virtual range mode may be, but is not required to be, suitable for user training and/or coaching. For example, a user may utilize the virtual range mode on an open field (e.g., a driving range). In this regard, the mixed-reality golf simulator may track hit balls over at least a portion of the trajectories and display any combination of user-selected data to the user such as, but not limited to, shot trajectories, tracking data for each shot (e.g., launch angle, hook angle, distance, loft height, or the like), comparisons of tracking data between different club types, or historical data associated with shots taken with one or more clubs. By way of another example, a user may utilize the virtual range mode when hitting balls into a constrained environment (e.g., a net, a screen, or the like). In this regard, the mixed-reality golf simulator may track balls over a partial trajectory (e.g., over a trajectory that ends when the motion of the ball is constrained), predict a full trajectory based on the partial trajectory, and display any combination of user-selected data to the user such as, but not limited to, shot trajectories, tracking data for each shot (e.g., launch angle, hook angle, distance, loft height, or the like), comparisons of tracking data between different club types, or historical data associated with shots taken with one or more clubs.

The virtual range mode may provide the user with any user-selected mixed reality environment. For example, the virtual range mode may include one or more user-selected augmented-reality elements (e.g., virtual objects integrated with real-world objects directly visible through the near-eye display). For instance, the virtual range mode may provide the user with a substantially real-world view visible through the near-eye display that is supplemented with tracking information (e.g., a visual of a ball trajectory, ball-tracking data, user-tracking data, club-tracking data, or the like) for the current and/or previous shots. In another instance, as described previously herein and illustrated in FIG. 7, the virtual range mode may provide the user with one or more objectives to accomplish such as, but not limited to, driving a selected distance, maintaining a hook angle below a selected threshold, achieving, a selected loft height, placing a ball on at selected location, or the like. Additionally, the objectives may include hitting virtual targets located at any height and/or distance to provide a training and/or a gaming experience.

Figure 8:
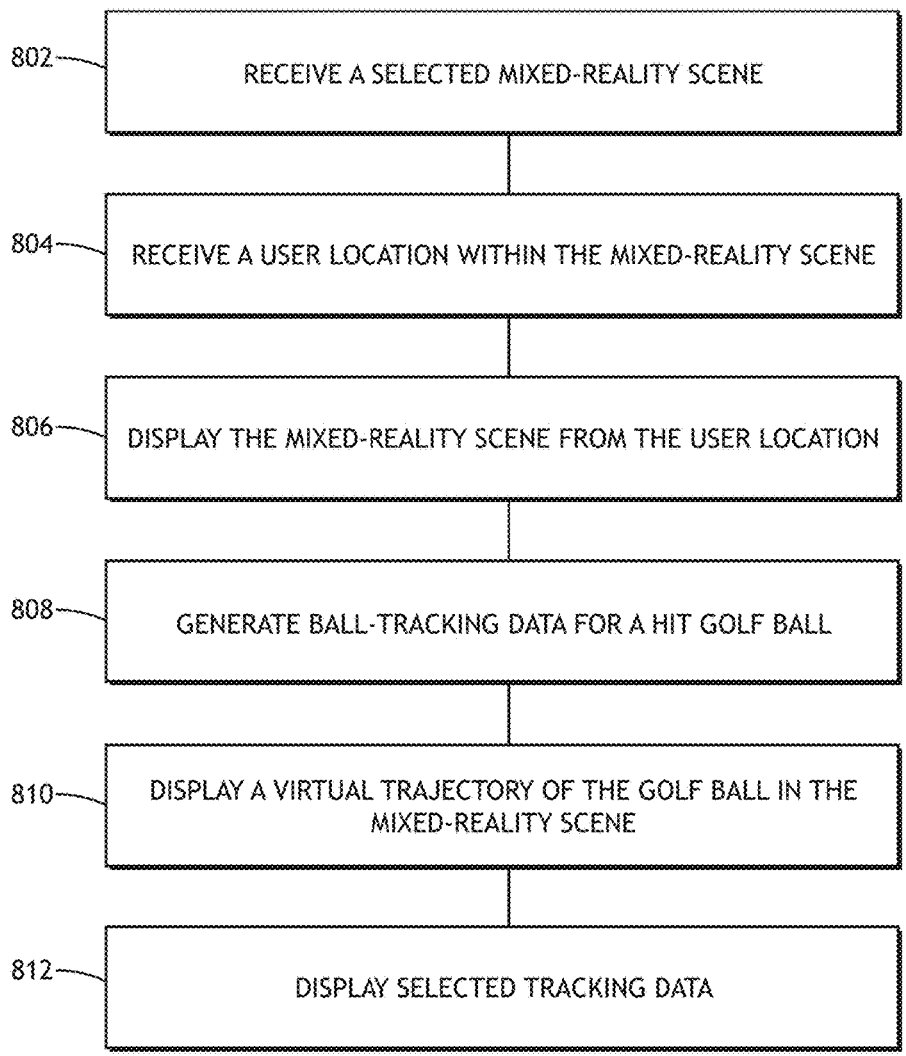
FIG. 8 is a flow diagram illustrating steps performed in a virtual range mode, in accordance with one or more embodiments of the present disclosure.

FIG. 8 is a flow diagram illustrating steps performed in a virtual range mode, in accordance with one or more embodiments of the present disclosure.

In one embodiment, the virtual range mode includes a step 802 of receiving a mixed-reality scene. For example, the virtual range mode may include a pre-configured default mixed-reality environment that may be further adjusted based on user preferences. In one instance, the mixed-reality environment includes a combination of physical and virtual objects associated with a fairway, a green, a pin, or the like. In another instance, the virtual environment includes environmental conditions such as, but not limited to, the time of day and the weather (temperature, pressure, wind speed, precipitation or the like). The environmental conditions may be automatically imported based on current conditions as monitored by sensors as described previously herein or may be adjusted by the user to provide a desired simulation environment. In another embodiment, the virtual range mode includes a step 804 of receiving a user location within the mixed-reality scene. For example, the user location may be provided via an input interface (e.g., the user interface 226 of the near-eye display 102, or the like). By way of another example, the user location may be determined based on a landing location of a previous shot (e.g., when playing a virtual course, or the like). In another embodiment, the virtual range mode includes a step 806 of displaying the mixed-reality scene from the user location. In this regard, the user may experience a panoramic view of the mixed-reality environment including any combination of real-world or virtual objects that updates based on the head orientation of the user.

In one embodiment, the user may select a mixed-reality scene in which to practice shots. For example, the user may select a mixed-reality scene of a well-known challenging hole (e.g., the island green, hole 17 at Sawgrass, or the like). By way of another example, the user may select a mixed-reality scene from a selected set of stored scenes associated with different shots such as, but not limited to, tee-box scenes to practice drives, fairway scenes to practice iron shots, or sand-trap scenes to practice sand shots. Accordingly, as described previously here, the user may view the selected scene when looking up in a direction of a shot and may view at least a partially unobstructed view of the ball when looking towards the ball.

In another embodiment, the virtual range mode includes a step 808 of generating ball-tracking data for a hit golf ball. In another embodiment, the virtual range mode includes a step 810 of displaying a virtual trajectory of the golf ball in the mixed-reality scene. In another embodiment, the virtual range mode includes a step 812 of displaying a selected tracking data. For example, the tracking data may include, but is not limited to, launch angle (horizontal and/or vertical), launch velocity, carry distance, roll distance, or loft height.

The ball-tracking data may be gathered using the ball-tracking sub-system 104 over the launch window. For example, in the case that the user is hitting the ball into a containment device (e.g., a net, a screen, or the like), the ball-tracking data may be generated for the partial trajectory prior to the ball hitting the containment device. Accordingly, a predicted trajectory as well as the selected tracking data may be calculated (e.g., using the controller 110, or the like) based on the partial trajectory. By way of another example, in the case that the user is in an open field (e.g., a driving range, or the like), step 808 may include generating ball-tracking data over the entire trajectory of the ball. In some cases, the ball-tracking sub-system 104 may not track the ball over the entire trajectory. Accordingly, a predicted trajectory as well as the selected tracking data may be calculated based on the tracked portion of the trajectory.

By way of another example, the virtual range mode may provide the user with an immersive virtual reality playing experience such as, but not limited to playing a virtual golf course. In this regard, the user may play one or more holes of a selected golf course from any remote location. In one embodiment, panoramic images (e.g., 360 degree panoramic images) of a real-world golf course are obtained at regular intervals along the course. For example, the panoramic images may be taken at any selected intervals such as, but not limited to, every foot, every three feet, or the like. Further, the panoramic images may be associated with or otherwise linked to location coordinates (e.g., GPS coordinates, or the like) along the course at which the images were taken. Once the images are taken, they may be stored either remotely or locally on an element of the mixed-reality golf simulator 100 (e.g., a memory medium 114 on the near-eye display 102, the ball-tracking sub-system 104, the user-tracking sub-system 106, the club-tracking sub-system 108, or the like and accessed for display to the user based on the head orientation of the user such that the user may walk around and view the course from multiple angles.

Figure 9:
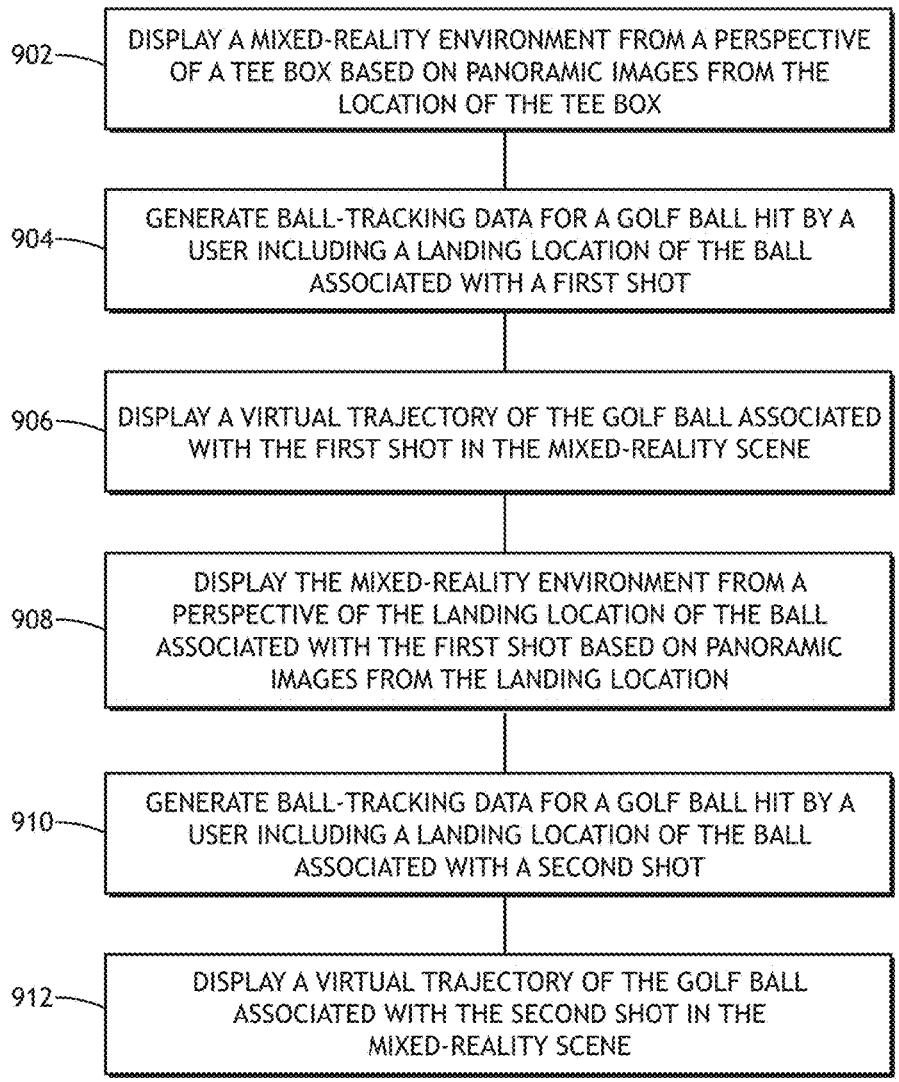
FIG. 9 is a flow diagram illustrating steps performed in a virtual course mode, in accordance with one or more embodiments of the present disclosure.

FIG. 9 is a flow diagram illustrating steps performed in a virtual course mode, in accordance with one or more embodiments of the present disclosure. In one embodiment, a virtual course mode includes a step 902 of displaying a mixed-reality environment from a perspective of a tee box based on panoramic images from the location of the tee box. For example, the tee box may be, but is not required to be, the starting location for a user to play a selected virtual hole. Accordingly, images associated with the tee box may be displayed to the user.

In another embodiment, a virtual course mode includes a step 904 of generating ball-tracking data for a golf ball hit by a user including a landing location of the ball associated with a first shot. In another embodiment, a virtual course mode includes a step 906 of displaying a virtual trajectory of the golf ball associated with the first shot in the mixed-reality scene. In this regard, the user may view the trajectory of the ball (either from full or predicted ball-tracking data) within the mixed-reality scene.

In another embodiment, a virtual course mode includes a step 908 of displaying the mixed-reality environment from a perspective of the landing location of the ball associated with the first shot based on panoramic images from the landing location. In this regard, the display may transition to the landing location of the first shot after the shot is completed to allow the user to prepare for an additional shot. Further, the step 908 may include determining a landing location of the first shot on the virtual course based on the landing location of the first shot. Accordingly, corresponding images associated with the landing location may be retrieved and displayed to the user. In another embodiment, a virtual course mode includes a step 910 of generating ball-tracking data for a golf ball hit by a user including a landing location of the ball associated with a second shot. In another embodiment, a virtual course mode includes a step 912 of displaying a virtual trajectory of the golf ball associated with the second shot in the mixed-reality scene. The virtual range mode may continue this operation for multiple shots until the user completes the hole and may further continue for multiple holes on the course. Further, the virtual courses mode may automatically track the score of user along the course during play.

The virtual range mode may further provide multi-player support, whether playing a virtual course or performing practice shots in a selected mixed-reality environment. In this regard, multiple players having near-eye displays may view the actions of each other including shots as well as tracked body or club movements. Additionally, the multiple players may be physically together or remote from each other. For example, multiple players may play a virtual course together, may play a target practice game against each other, may view shots and/or provide coaching assistance to other players, or the like.

Figure 10:
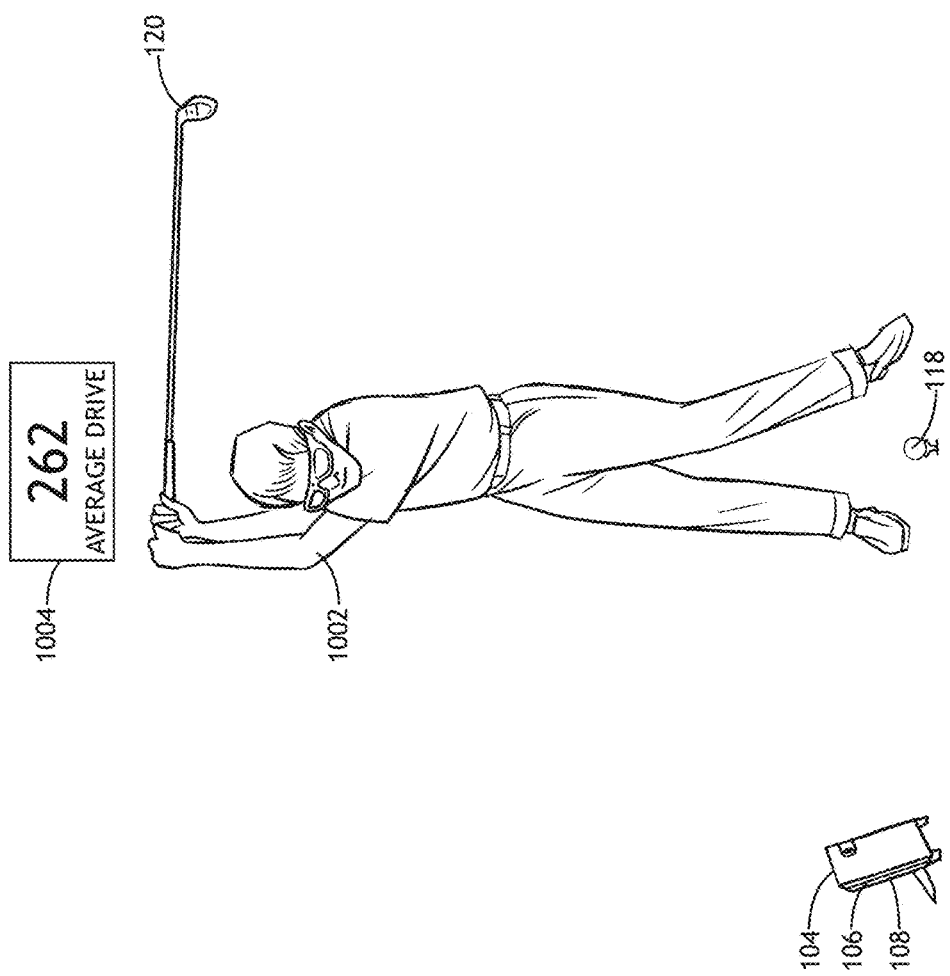
FIG. 10 is a conceptual view of a first player visible to a second player, in accordance with one or more embodiments of the present disclosure.

FIG. 10 is a conceptual view of a first player 1002 visible to a second player (not shown), in accordance with one or more embodiments of the present disclosure. For example, in the case that the first player 1002 and the second player are physically together, the first player 1002 may be visible as a real object through the near-eye display 102 of the second user. Further, surrounding objects such as, but not limited to, the ball-tracking sub-system 104, the user-tracking sub-system 106, or the club-tracking sub-system 108 may be visible as real-world objects. By way of another example, in the case that the first player 1002 and the second player are remote from each other, the first player 1002 may be visible as an avatar. Further, the avatar may have the likeness of the first player 1002 or may have any selected likeness such as, but not limited to, a well-known golfer or a custom-designed avatar.

In another embodiment, player data (e.g., ball-tracking data, user-tracking data, club-tracking data, or the like) may be visible in the mixed-reality environment. For example, as illustrated in FIG. 10, a virtual data object 1004 associated with the average drive distance of the first player 1002 is visible near or overlaid onto the first player 1002.

Figure 11:
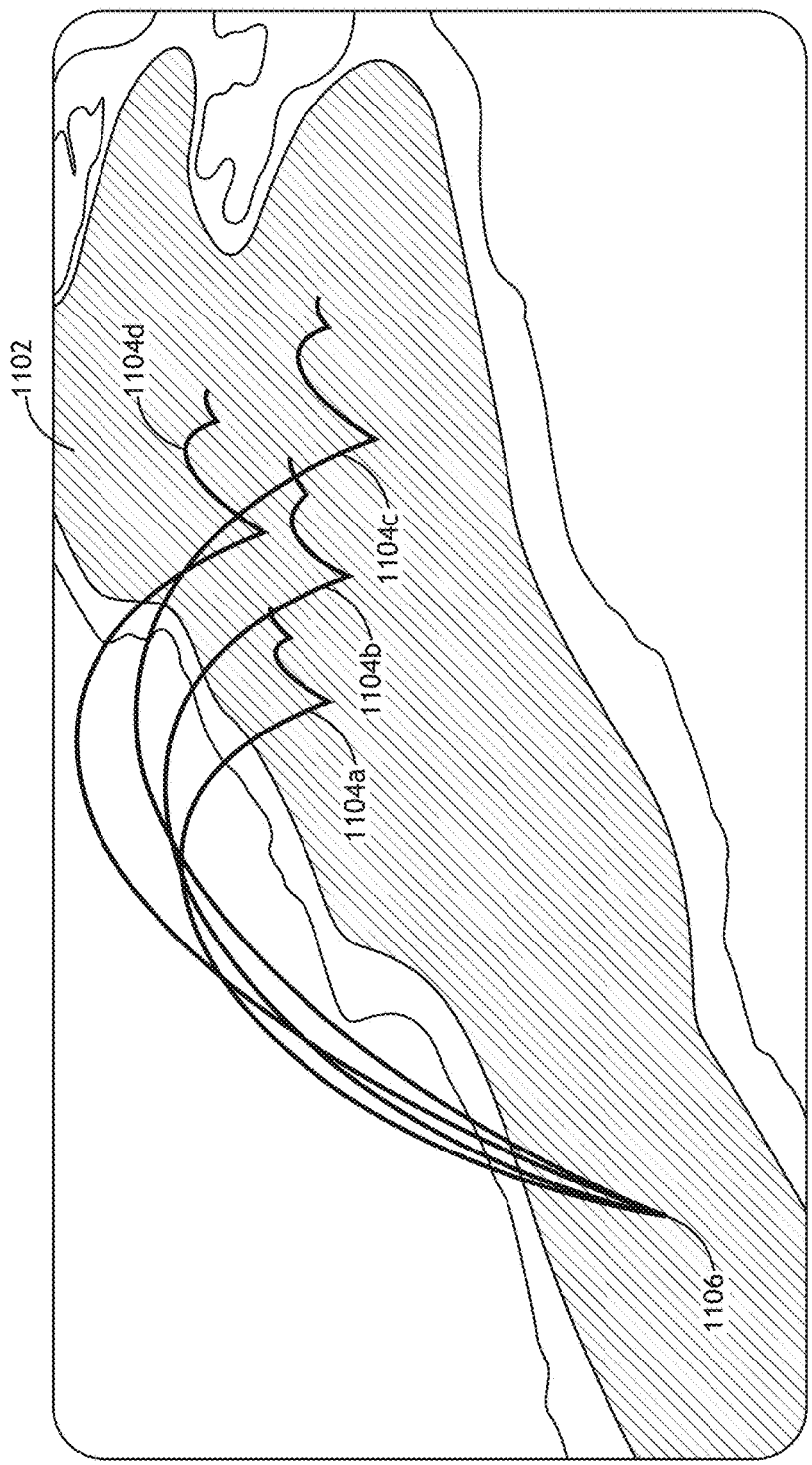
FIG. 11 is a perspective view of a hole including trajectories of four players from a common location, in accordance with one or more embodiments of the present disclosure.

In another embodiment, the virtual courses mode provides comparative data associated with multiple players. For example, the virtual courses mode may display shot statistics for each player (e.g., shot distance, loft height, or the like). By way of another example, the virtual courses mode may display a comparative analysis of the trajectories of shots by multiple players. FIG. 11 is a perspective view 1100 a hole 1102 including of trajectories 1104*a-d* of four players from a common location 1106, in accordance with one or more embodiments of the present disclosure. For example, the hole 1102 and the trajectories 1104*a-d* may be displayed as virtual objects on any near-eye display device worn by any player.

In some embodiments, a mixed-reality golf simulator includes a virtual caddy mode suitable for augmenting the experience of play on a real-world golf course. For example, the virtual caddy mode may track shots performed on the real-world course and display information (e.g., as augmented-reality virtual objects) such as, but not limited to, trajectories of shots and landing locations of shots.

In one embodiment, the virtual caddy mode captures (e.g., aggregates, or the like) data associated with shots hit by the user using multiple clubs. In this regard, the mixed-reality golf simulator 100 may provide suggestions on which club to use in a particular situation (e.g., a situation input using the user interface 226 of the near-eye display 102, or the like).

Figure 12:
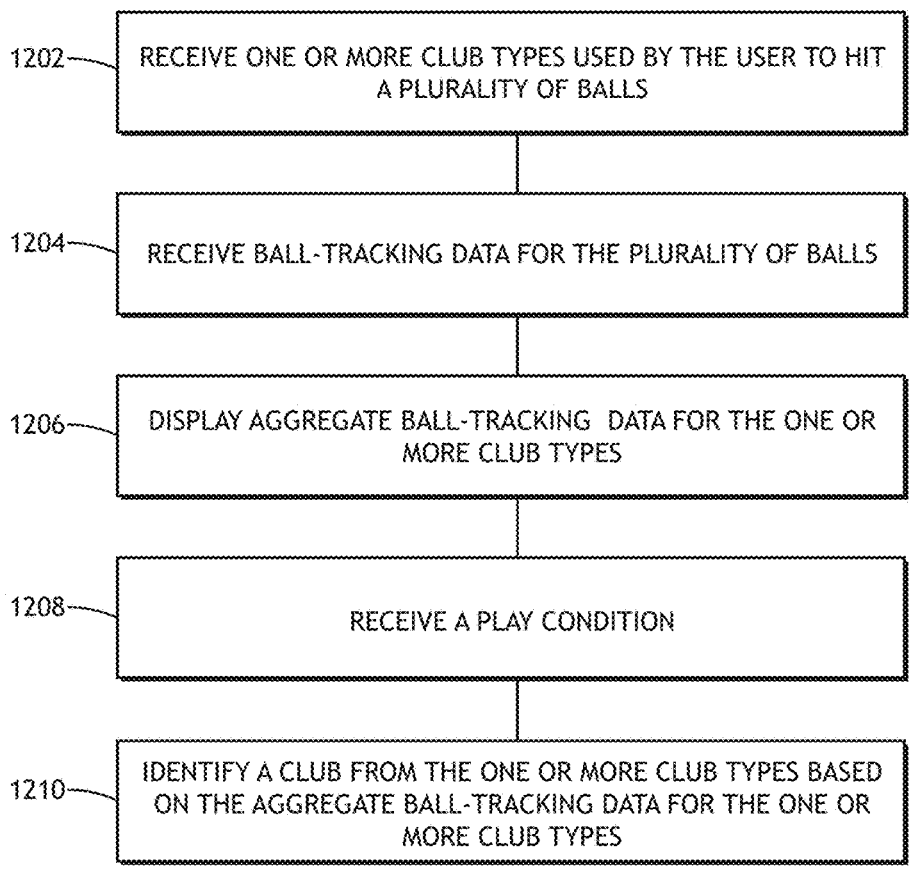
FIG. 12 is a flow diagram illustrating steps performed in a virtual caddy mode, in accordance with one or more embodiments of the present disclosure.

FIG. 12 is a flow diagram illustrating steps performed in a virtual caddy mode, in accordance with one or more embodiments of the present disclosure. In one embodiment, the virtual caddy mode includes a step 1202 of receiving one or more club types used by the user to hit a plurality of balls, in accordance with one or more embodiments of the present disclosure. For example, the club types may be entered via the user interface 226 of the near-eye display 102, or may be automatically detected (e.g., by the camera 214 on the near-eye display 102, the camera 302 of the club-tracking sub-system 108, or the like).

In another embodiment, the virtual caddy mode includes a step 1204 of receiving ball-tracking data for the plurality of balls (e.g., from the ball-tracking sub-system 104). In another embodiment, the virtual caddy mode includes a step 1206 of displaying aggregate ball-tracking data for the one or more club types. For example, separate ball-tracking data (e.g., average distance, average loft height, average hook angle, or the like) may be provided for each club type used. Further, the data may be provided in alphanumeric or graphical form. For instance, statistical values (e.g., average values, maximum values, minimum values, or the like) may be present in alphanumeric form. In another instance, multiple trajectories may be presented in a graphical form.

The virtual caddy mode may further select a club from the one or more club types for the user based on a play condition (e.g., a distance to pin, weather conditions, or the like). In another embodiment, the virtual caddy mode includes a step 1208 of receiving play conditions. For example, the play conditions may be entered by the user (e.g., via the user interface 226 of the near-eye display 102, or the like) or may be automatically detected (e.g., based on a user location on a known course, through positional and/or environmental sensors coupled to the system, or the like). In another embodiment, the virtual caddy mode includes a step 1210 of selecting a club from the one or more club types based on aggregate ball-tracking data for the one or more club types. Further, the step 1210 may consider environment conditions when identifying a club. For example, on a windy day, it may be preferable to avoid high loft heights and/or hang times. Accordingly, aggregate data associated with loft heights and/or hang times for each club may be considered to identify a club for a particular play condition.

A club may be selected using any technique known in the art. For example, a club may be selected using a club selector that is trained based on ball-tracking data associated with balls hit by the user using multiple club types. For instance, a user may hit multiple balls using a first club type (e.g., a driver), a second club type (e.g., a 9-iron), a third club type (e.g., a 7-iron) and so on. In this regard, ball-tracking data may be gathered and correlated to each club type. Further, this ball-tracking data may be associated with a particular user and may thus represent the play characteristics of the particular user.

The club selector may then utilize the ball-tracking data associated with each club type to select a club for the user in a given situation (e.g., a given distance to pin, weather conditions, or the like).

In one embodiment, a club selector selects a club by comparing the distance to pin to average shot distance data for each club type. By way of another example, a club may be selected based on a machine learning technique such as, but not limited to classification, sorting, clustering, outlier detection, regression analysis, instance-based analysis (e.g., nearest neighbor analysis, or the like), dimensionality reduction (e.g., factor analysis, feature extraction, principal component analysis, or the like) supervised learning (e.g., artificial neural networks, support-vector machines, random forests, or the like), semi-supervised learning (e.g., generative models, or the like), unsupervised learning (e.g., vector quantization, or the like), deep learning, or Bayesian statistics. It is to be understood that the analysis techniques and any associated labels are provided solely for illustrative purposes and are not intended as limiting. It is further recognized herein that analysis techniques may be described and/or categorized in a variety of ways. Further, combinations of analysis techniques may be implemented.

In one embodiment, a machine-learning-based club selector is trained based on aggregate ball-tracking data and associated club types as well as any play conditions (e.g., environmental conditions associated with the collection of the ball-tracking data, or the like). The club selector may thus identify one or more patterns based on the training data suitable. Accordingly, when the user is on a course, the club selector may accept the distance to the pin as well as any play conditions as inputs and provide a selected club that is predicted to allow the user to place the ball near the pin.

In another embodiment, the virtual caddy mode assists a user in performing shots. In one instance, the virtual caddy mode may display distances to various landmarks on the course (e.g., the pin, traps, suggested target locations for placing the ball, or the like). In another instance, the virtual caddy mode may display predicted and/or suggested trajectories associated with one or more clubs (e.g., based on historical usage data by the user, an average user of a similar skill level, or the like) to guide the user in selecting a club. In another instance, the virtual caddy mode may display a contour of a course or a portion thereof. In this regard, the user may identify changes in topography and may adjust a shot accordingly. For example, surface profile information of a course may be stored in memory (e.g., a memory medium 114, or the like), retrieved, and displayed based on the location and orientation of the user. By way of another example, system components (e.g., the near-eye display 102, the ball-tracking sub-system 104, the club-tracking sub-system 108, or the like) may determine surface profile information for portions of the course within a field of view of the user using any technique known in the art such as, but not limited to, image analysis of images from at least one camera 214 or a range-finding technique (e.g., LIDAR, or the like).

Figure 13:
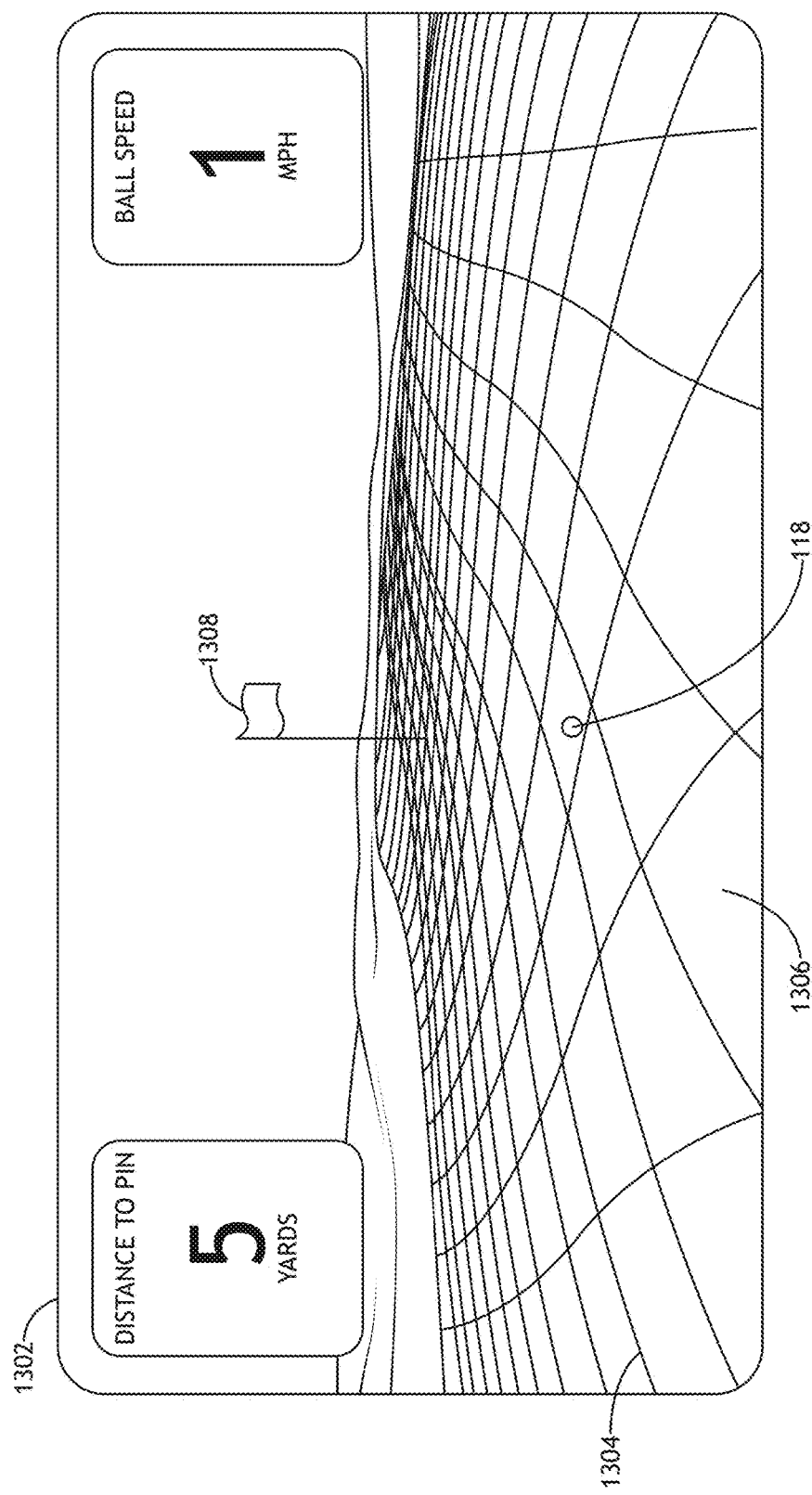
FIG. 13 is a field of view illustrating a contour overlaid on a green 1306 around a pin from the perspective of a user, in accordance with one or more embodiments of the present disclosure.

As a non-limiting example, FIG. 13 is a field of view 1302 illustrating a contour 1304 overlaid on a green 1306 around a pin 1308 from the perspective a user, in accordance with one or more embodiments of the present disclosure. Further, relevant user-guiding data 1310 (e.g., total distance, ball speed, or the like) may be displayed to the user.

Figure 14:
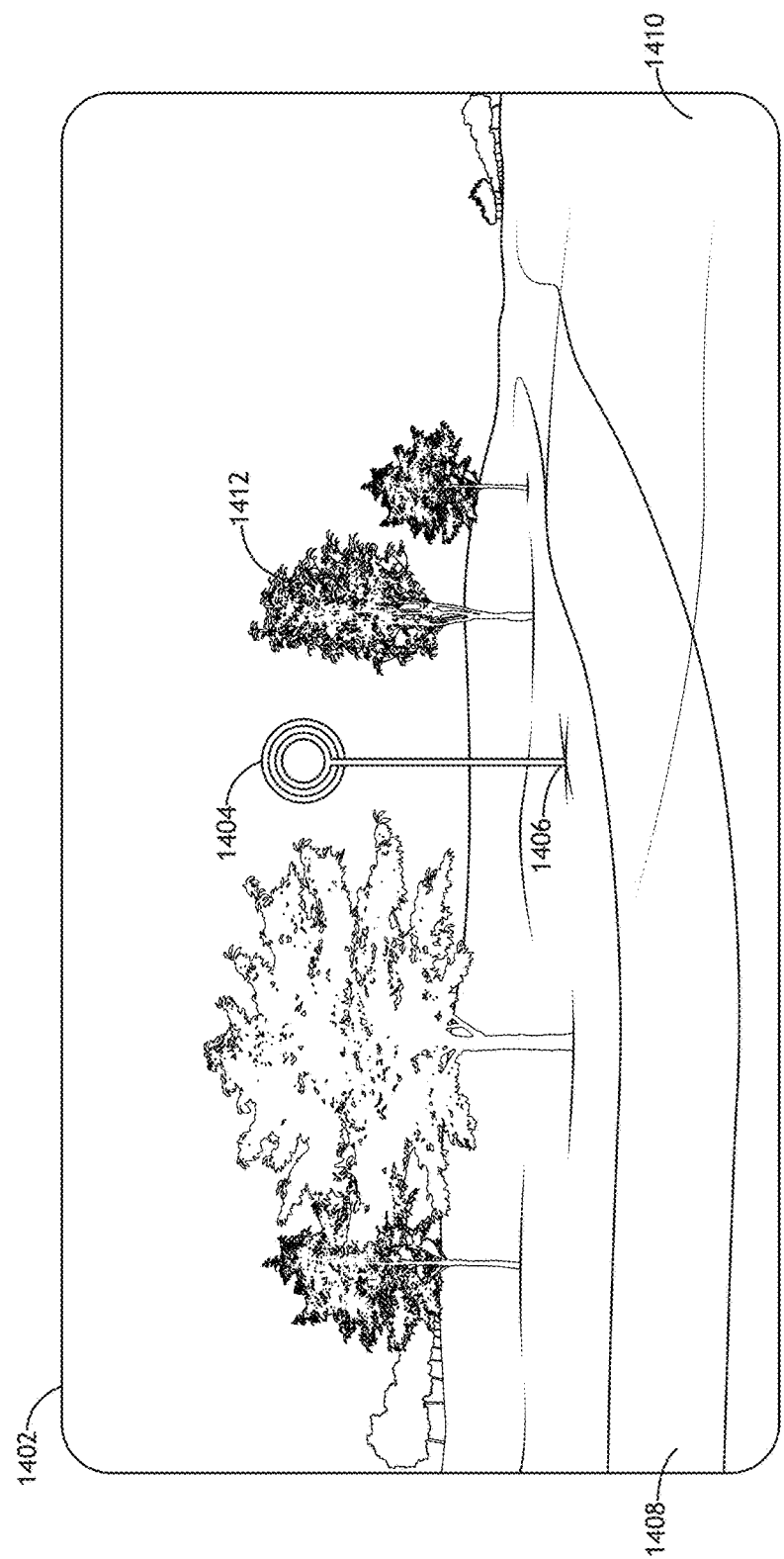
FIG. 14 is a conceptual view of a pin identifying a location of a hit ball, in accordance with one or more embodiments of the present disclosure.

In another embodiment, the virtual caddy mode assists a user in locating a ball. For example, the virtual caddy mode may display a virtual object signifying the location of a hit ball based on the ball-tracking data (e.g., from the ball-tracking sub-system 104). The virtual object may be any type of indicator such as, but not limited to, a marker visible from any viewing angle or applying an effect such as shading or a glow to the ball when the ball is visible with the camera 214 of the near-eye display 102. FIG. 14 is a conceptual view 1402 of a marker 1404 identifying a location 1406 of a hit ball, in accordance with one or more embodiments of the present disclosure. Further, the layout of the course including, but not limited to, a sidewalk 1408, a fairway 1410, or trees 1412 may be visible as real-world objects through the near-eye display 102.

In another, a mixed-reality golf simulator includes a virtual instructor mode to provide guided user coaching using any combination of audio and mixed-reality visualizations. For example, a mixed-reality projectile-tracking simulator may provide coaching suggestions to a user on various techniques, suggest body positions, or the like. For instance, a mixed-reality projectile-tracking simulator may provide guides for the user such as, but not limited to, guides for suggested body positions, body movements, club movements, or ball trajectories. In this regard, the user may be provided suggested techniques for accomplishing certain types of shots (e.g., drives, pitching onto a green, hitting out of a sand trap, or the like). Further, the coaching suggestions may be based on data from the ball-tracking system and/or the user-tracking system for a single shot or based on an analysis of historical data. It is recognized herein that while certain fundamental aspects of a swinging technique may be relevant to all or most users, it may be the case that certain technical aspects may vary between users such that coaching suggestions may be personalized. Accordingly, a mixed-reality golf simulator may generate correlations between aspects of user motion, club motion, and corresponding trajectories over time based on historical data tracked and stored by the system to develop customized feedback for individual users.

The virtual instructor mode may provide mixed-reality feedback to the user. For example, a mixed-reality golf simulator may utilize data from the user-tracking system and/or the ball-tracking system to capture and subsequently replay user and ball motion. In one instance, as illustrated in FIG. 4, the mixed-reality golf simulator may display a 3D avatar of the user performing selected shots in mixed-reality.

Figure 15:
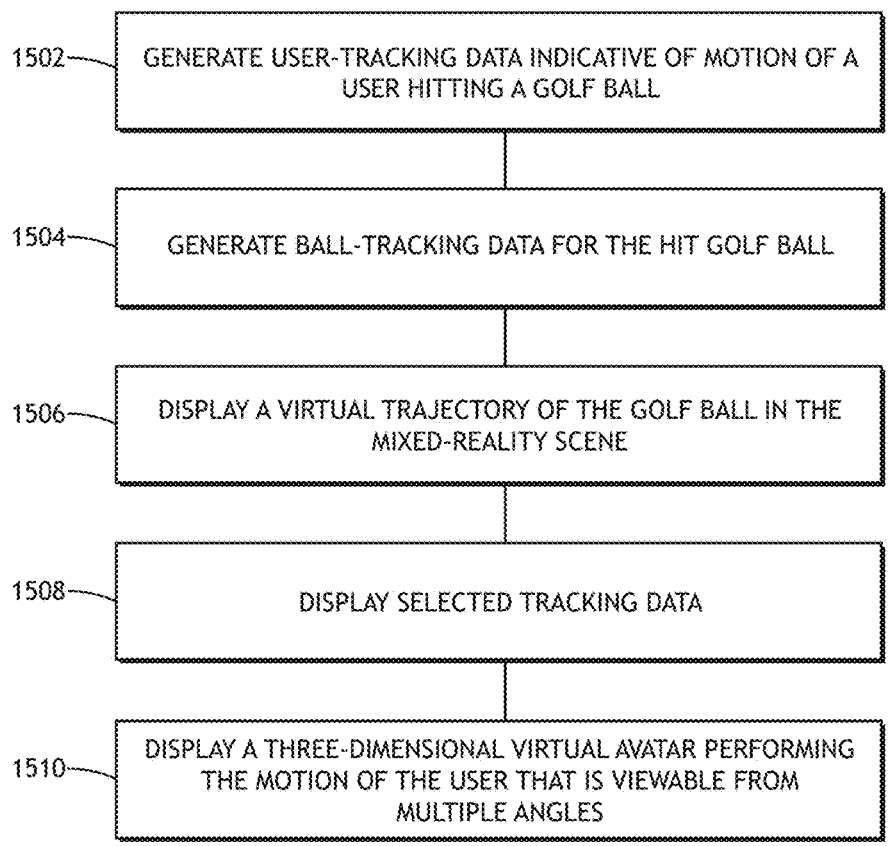
FIG. 15 is a flow diagram illustrating steps performed in a virtual instructor mode, in accordance with one or more embodiments of the present disclosure.

FIG. 15 is a flow diagram illustrating steps performed in a virtual instructor mode, in accordance with one or more embodiments of the present disclosure.

In one embodiment, the virtual instructor mode includes a step 1502 of generating user-tracking data indicative of motion of a user hitting a ball. For example, user-tracking data may be generated by the user-tracking sub-system 106. In another embodiment, the virtual instructor mode includes a step 1504 of generating ball-tracking data for the hit golf ball. For example, ball-tracking data may be generated by the ball-tracking sub-system 104. In another embodiment, the virtual instructor mode includes a step 1506 of displaying a virtual trajectory of the golf ball in the mixed-reality scene (e.g., based on the ball-tracking data). In another embodiment, the virtual instructor mode includes a step 1508 of displaying selected tracking data (e.g., ball-tracking data, user-tracking data, club-tracking data, or the like). In another embodiment, the virtual instructor mode includes a step 1510 of displaying a three-dimensional virtual avatar performing the motion of the user that is viewable from multiple angles. Accordingly, a user may save and later view a saved shot in a 3D mixed-reality environment such that the user may walk around the avatar and view the motion of the user's body and/or the motion of the ball from a variety of angles. It is recognized herein that viewing saved shots in a 3D mixed-reality environment may provide useful feedback to the user. For example, a user may save and review successful attempts to determine what techniques work well and what techniques do not.

Further, the virtual instructor mode may be accessed along with any other modes such as, but not limited to, the virtual range mode, the virtual course mode, or the virtual caddy mode. In this regard, the mixed-reality golf simulator 100 may provide coaching feedback in any situation.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A mixed-reality golf simulation system comprising:
   a ball-tracking sub-system configured to generate ball-tracking data when a golf ball is hit by a user;
   a near-eye display with a partially-transparent display element configured to display mixed-reality virtual objects displayed over physical objects within a user field of view, wherein the near-eye display includes a user input device, wherein the near-eye display includes one or more head orientation sensors to determine a head orientation of the user;
   a storage device to store panoramic images of a hole of a golf course from a plurality of locations along the hole, wherein the panoramic images are associated with location coordinates of the plurality of locations along the hole; and
   a controller communicatively coupled to the ball-tracking sub-system and the near-eye display, the controller including one or more processors configured to execute program instructions causing the one or more processors to:
      direct the near-eye display to display, based on the head orientation of the user received from the near-eye display, a mixed-reality environment including a virtual reality scene from the perspective of a first location on the hole over at least a portion of the user field of view when the user is looking in one or more selected directions and at least a partially unobstructed real-world view through the partially-transparent display element when the user is looking at a location from which the ball is to be hit, wherein the virtual reality scene from the perspective of the first location includes images from the storage device associated with location coordinates of the first location;
      receive ball-tracking data of a ball hit by the user in real-time from the ball-tracking sub-system, wherein the ball-tracking data includes a first landing location of the ball associated with a first shot;
      direct the near-eye display to display, based on the head orientation of the user received from the near-eye display, the mixed-reality environment including a virtual reality scene from the perspective of the first landing location of the ball over at least a portion of the user field of view, wherein the virtual reality scene from the perspective of the first landing location of the ball includes images from the storage device associated with location coordinates of the first landing location of the ball; and
      receive ball-tracking data of a ball hit by the user in real-time from the ball-tracking sub-system, wherein the ball-tracking data includes a second landing location of the ball associated with a second shot.

2. The mixed-reality golf simulation system of claim 1, wherein the one or more processors are further configured to execute program instructions causing the one or more processors to:
   direct the near-eye display to display a virtual object representing a trajectory of the ball associated with the first shot; and
   direct the near-eye display to display a virtual object representing a trajectory of the ball associated with the second shot.

3. The mixed-reality golf simulation system of claim 1, wherein the ball-tracking sub-system comprises:
   one or more sensors integrated within the ball, wherein the one or more sensors transmit the ball-tracking data to the controller via wireless communication.

4. The mixed-reality golf simulation system of claim 3, wherein the ball-tracking sub-system comprises:
   at least one of a motion sensor, an accelerometer, an orientation sensor, or a position sensor.

5. The mixed-reality golf simulation system of claim 1, wherein the ball-tracking sub-system generates ball-tracking data of the ball over a launch window, wherein the launch window ends when motion of the ball is hindered by a ball containment device, wherein the ball containment device comprises:
   at least one of a net or a screen.

6. The mixed-reality golf simulation system of claim 1, wherein the near-eye display is configured to display an unobstructed real-world view when the near-eye display determines that a gaze direction of the user is directed at the ball prior to a shot, wherein the near-eye display is further configured to transition to a display of the mixed reality environment when the near-eye determines that a gaze direction of the user is directed above a selected angle.

7. The mixed-reality golf simulation system of claim 6, wherein the near-eye display is configured to fade transparency values of the one or more virtual objects of the mixed reality environment based on the gaze direction of the user.

8. The mixed-reality golf simulation system of claim 1, wherein the one or more processors are further configured to execute program instructions causing the one or more processors to:
 direct the near-eye display to display a virtual object representing at least one of a launch velocity, a launch angle, a hook angle, a rotation axis, a rotation rate, a hang time, a carry distance, a roll distance, or a total distance.

9. The mixed-reality golf simulation system of claim 1, wherein the virtual reality scene comprises:
 an avatar associated with a remote user.

10. The mixed-reality golf simulation system of claim 1, wherein the one or more processors are further configured to execute program instructions causing the one or more processors to:
 direct the near-eye display to provide coaching feedback to the user based on the predicted trajectory.

11. The mixed-reality golf simulation system of claim 1, wherein the coaching feedback comprises:
 at least one of audio information or virtual display objects.

12. The mixed-reality golf simulation system of claim 1, further comprising:
 a user-tracking sub-system including one or more sensors to generate user-motion data indicative of motion of the user during a shot.

13. The mixed-reality golf simulation system of claim 12, wherein the one or more sensors comprise:
 at least one of a camera or one or more wearable sensors.

14. The mixed-reality golf simulation system of claim 12, wherein the one or more processors are further configured to execute program instructions causing the one or more processors to:
 direct the near-eye display to display a virtual object including an avatar representing the user after a shot, wherein the avatar simulates motion of the user during the shot based on the user-motion data.

15. The mixed-reality golf simulation system of claim 1, wherein the ball-tracking sub-system is located external to the ball.

16. The mixed-reality golf simulation system of claim 15, wherein the ball-tracking sub-system comprises:
 at least one of a camera, a doppler-tracking device, or a LIDAR-tracking device.

17. A mixed-reality golf simulation system comprising:
 a ball-tracking sub-system configured to generate ball-tracking data for golf balls hit by a user;
 a near-eye display with a partially-transparent display element configured to display mixed-reality virtual objects displayed over physical objects within a user field of view; and
 a controller communicatively coupled to the ball-tracking sub-system and the near-eye display, the controller including one or more processors configured to execute program instructions causing the one or more processors to:
 direct the near-eye display to display, based on a head orientation of the user received from the near-eye display, a mixed-reality environment including virtual objects within at least a portion of the user field of view when the user is looking in one or more selected directions and at least a partially unobstructed real-world view through the partially-transparent display element when the user is looking at a location from which the ball is to be hit;
 receive ball-tracking data for a plurality of balls hit by the user with a first club type of two or more club types;
 receive ball-tracking data for a plurality of balls hit by the user with at least a second club type of the two or more club types;
 train a club selector to select a club for the user based on the ball-tracking data associated with the first club type and the ball-tracking data associated with the at least a second club type;
 select a club for the user from any of the two or more club types based on a distance to a pin with the club selector.

18. The mixed-reality golf simulation system of claim 17, wherein select, with the club selector, clubs for the user for one or more subsequent shots based on the distance to the pin comprises:
 train the club selector using a machine learning technique.

19. The mixed-reality golf simulation system of claim 17, wherein the one or more processors are further configured to execute program instructions causing the one or more processors to:
 receive environmental conditions associated with at least a portion of the ball-tracking data; and
 train the club selector based on the environmental conditions.

20. The mixed-reality golf simulation system of claim 19, wherein receive environmental conditions associated with at least a portion of the ball-tracking data comprises:
 receive environmental conditions associated with at least a portion of the ball-tracking data from the user via a user input device.

21. The mixed-reality golf simulation system of claim 19, wherein receive environmental conditions associated with at least a portion of the ball-tracking data comprises:
 receive environmental conditions associated with at least a portion of the ball-tracking data from one or more environmental sensors.

22. The mixed-reality golf simulation system of claim 17, wherein the mixed-reality environment includes at least one of at least one of a fairway, a green, or a pin.

23. The mixed-reality golf simulation system of claim 17, wherein the mixed-reality environment includes a virtual object displayed over a portion of the field of view, wherein at least a portion of the field of view is unobstructed to provide visualization of physical objects through the near-eye display, wherein a displayed perspective of the virtual object is continually updated based on a location of the user within the mixed reality environment.

24. The mixed-reality golf simulation system of claim 17, wherein the mixed-reality environment includes a virtual reality scene obstructing at least a portion of the field of view from a vantage point of the user at a selected location within the virtual reality scene.

25. A mixed-reality golf simulation system comprising:
 a ball-tracking sub-system configured to generate ball-tracking data when a golf ball is hit by a user;
 a user-tracking sub-system configured to generate user-tracking data when the golf ball is hit by the user;
 a near-eye display with a partially-transparent display element configured to display mixed-reality virtual objects displayed over physical objects within a user field of view, wherein the near-eye display includes a user input device, wherein the near-eye display includes one or more head orientation sensors to determine a head orientation of the user; and a controller communicatively coupled to the ball-tracking sub-system and the near-eye display, the controller including one or more processors configured to execute program instructions causing the one or more processors to:

direct the near-eye display to display, based on the head orientation of the user received from the near-eye display, a mixed-reality environment including virtual objects within at least a portion of the user field of view when the user is looking in one or more selected directions and at least a partially unobstructed real-world view through the partially-transparent display element when the user is looking at a location from which the ball is to be hit;

receive ball-tracking data of a ball hit by the user in real-time from the ball-tracking sub-system;

receive user-tracking data of the user as the ball is hit by the user in real-time from the user-tracking sub-system, wherein the user-tracking data is indicative of a motion of the user as the ball is hit by the user; and direct the near-eye display to display virtual objects in the mixed-reality display environment including a virtual avatar simulating the motion of the user as the ball is hit by the user, wherein the virtual avatar is a three-dimensional virtual object viewable from multiple angles by the user in the mixed-reality environment.

\* \* \* \* \*